United States Patent
Kung

(10) Patent No.: US 11,485,058 B2
(45) Date of Patent: Nov. 1, 2022

(54) INJECTION MOLDING MACHINE DEVICE WITH MULTIPLE SENSORS

(71) Applicant: LOTES CO., LTD, Keelung (TW)

(72) Inventor: Yung Sheng Kung, Keelung (TW)

(73) Assignee: LOTES CO., LTD, Keelung (TW)

( * ) Notice: Subject to any disclaimer, the term of this patent is extended or adjusted under 35 U.S.C. 154(b) by 121 days.

(21) Appl. No.: 17/204,112

(22) Filed: Mar. 17, 2021

(65) Prior Publication Data

US 2021/0197429 A1 Jul. 1, 2021

Related U.S. Application Data

(60) Division of application No. 16/838,127, filed on Apr. 2, 2020, now Pat. No. 11,148,330, which is a continuation-in-part of application No. 15/692,364, filed on Aug. 31, 2017, now abandoned.

(30) Foreign Application Priority Data

Jan. 25, 2017 (CN) .......................... 201720114078.5
Mar. 17, 2020 (CN) .......................... 202010216537.7

(51) Int. Cl.
   *B29C 45/04* (2006.01)
   *B29C 45/80* (2006.01)
   *B29C 45/17* (2006.01)
   *B29C 45/76* (2006.01)

(52) U.S. Cl.
   CPC ...... *B29C 45/0408* (2013.01); *B29C 45/1771* (2013.01); *B29C 45/7653* (2013.01); *B29C 45/80* (2013.01)

(58) Field of Classification Search
   None
   See application file for complete search history.

(56) References Cited

U.S. PATENT DOCUMENTS

| 5,388,983 A * | 2/1995 | Hehl ................... B29C 45/1773 264/328.11 |
| 2003/0090014 A1 * | 5/2003 | Heinrich ............. B29C 35/0888 264/1.32 |
| 2004/0217501 A1 * | 11/2004 | Hakoda ............... B29C 45/7653 264/328.1 |
| 2004/0241358 A1 * | 12/2004 | Kotani ............. B29C 45/14065 428/34.1 |
| 2019/0118447 A1 * | 4/2019 | Kilian ................. B29C 45/7653 |

* cited by examiner

*Primary Examiner* — Joseph S Del Sole
*Assistant Examiner* — Guy F Mongelli
(74) *Attorney, Agent, or Firm* — Locke Lord LLP; Tim Tingkang Xia, Esq.

(57) ABSTRACT

An injection molding machine device includes at least two guide rods. One end of each guide rod is fixed to a rack, and the other end of each guide rod is fixed to a fixed base body. A movable base body is provided opposite to the fixed base body. The movable base body slides along the guide rods relative to the fixed base body. At least one correction mechanism is located between the movable base body and the guide rail to adjust a movement of the movable base body in a vertical direction. A predetermined clearance value and/or a predetermined contact force value exist between the components. At least one sensor is electrically connected to a controller. The controller correspondingly controls the correction mechanism by determining whether corresponding detecting values of the sensor match with the predetermined clearance values and/or the predetermined contact force values.

8 Claims, 26 Drawing Sheets

INJECTION MOLDING MACHINE DEVICE WITH MULTIPLE SENSORS

CROSS-REFERENCE TO RELATED PATENT APPLICATION

This application is a divisional application of U.S. application Ser. No. 16/838,127 (hereinafter the "'127 Application"), filed Apr. 2, 2020, now pending, which itself is a continuation-in-part of U.S. patent application Ser. No. 15/692,364, filed Aug. 31, 2017, which claims priority to and benefit of, under 35 U.S.C. § 119(a), Patent Application No. 201720114078.5 filed in P.R. China on Jan. 25, 2017. The '127 Application also claims priority to and benefit of, under 35 U.S.C. § 119(a), Patent Application No. 202010216537.7 filed in P.R. China on Mar. 17, 2020. The disclosures of the above applications are incorporated herein in their entireties by reference.

Some references, which may include patents, patent applications and various publications, are cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference were individually incorporated by reference.

FIELD

The present invention relates generally to an injection molding machine device, and more particularly to an injection molding machine device that can automatically adjust the height of a movable mold base.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

The movable mold plate of a plastic injection molding machine has long movement stroke, and the weight of a mold base itself and the weight of a mold are very high, so a support mechanism will be arranged below a movable mold base to transfer the gravity of the movable mold base and the mold plate to an injection molding machine rack, thereby reducing the burden of mold gravity on guide rods.

A simple quick mold changing device was disclosed in Chinese Patent No. CN200820024361, in which a support mechanism for a mold is that a support positioning block is mounted below a device fixing plate and a movable mold base, and the upper positioning surface of the support positioning block is matched with the lower positioning surface of the mold to play a role of supporting the mold. The support mode belongs to a fixed support mode, and has the disadvantages that due to the manufacturing tolerance of the machine itself or the wear of a Gelin column or the support positioning block after long-time use of the machine, the movable mold base will sink or tilt relative to the fixing plate, or because the molds are not in the same horizontal plane due to the machining tolerance of the positioning surfaces of the molds themselves, the upper positioning surface of a certain support positioning block or the upper positioning surfaces of certain support positioning blocks cannot be fully matched with the lower positioning surface of a mold positioning mechanism to generate a gap. During mold opening, the gap side of the mold sinks due to the action of gravity, so that a connecting mechanism at the side is mismatched with a connecting mechanism at the other side. During mold closing, the wear of the connecting mechanism between the molds will be caused, and the service life of the mold is shortened.

In order to solve the foregoing problem, an adjustable support positioning mechanism is disclosed in the related art, such as a mold plate support guide device disclosed in Chinese Patent No. 201510439127, which includes a rack guide rail arranged in the horizontal direction, where both the top surface and the side surface are provided with support adjusting modules urged through grooves. The support adjusting module includes a first wedge block in slide matching with the rack rail, and a second wedge block fixedly connected with a mold plate support leg, an intermediate block is urged between the first wedge block and the second wedge block, and the support adjusting module is provided with an adjusting component for adjusting the distance between the bottom surface of the first wedge block and the top surface of the second wedge block. The movable mold plate can be adjusted by the support adjusting module in three directions so that the mold plate can be stably and precisely placed on the rack guide rail, thus reducing the requirements of machining accuracy of the rack and the mold plate.

However, in the above-mentioned adjusting component, a connecting shaft is in threaded connection with the intermediate block, manual adjustment is needed and a device for measuring or displaying the height of the movable mold base in real time is not provided. After the support device is worn due to the long-term reciprocating movement on the guide rail, the height of the movable mold base needs to be manually measured and adjusted, thereby increasing the labor intensity. In addition, in confirming the final adjusted height of the movable mold base, the adjusted height is generally obtained by estimation according to experience, or by multiple repeated trials, thereby increasing the labor intensity. Further, it is impossible to know the sinking height or tilting degree of the movable mold base real-time and accurately, resulting in the adjusted height of the movable mold base and an actual sinking height thereof to be significantly different, thereby causing significant wear between the connecting mechanisms.

Therefore, a heretofore unaddressed need to design a novel injection molding machine device exists in the art to address the aforementioned deficiencies and inadequacies.

SUMMARY

In view of the deficiency of the background, the present invention is directed to an injection molding machine device, which is provided with sensors to detect clearances and/or contact forces between connecting components of the injection molding machine device due to the tilting of a movable base body, thereby correspondingly controlling a correction mechanism to adjust the movement of the movable base body in a vertical direction, such that the detection values of the sensors reach predetermined clearance values and/or predetermined contact force values, and the wear between the movable base body and the guide rods becomes smaller and more controllable.

To achieve the foregoing objective, the present invention adopts the following technical solutions.

An injection molding machine device includes: a rack; at least one guide rail fixed to the rack; at least two guide rods, wherein one of two ends of each of the at least two guide rods is fixed to the rack; a fixed base body fixed to one end of the rack, wherein the other of the two ends of each of the at least two guide rods is fixed to the fixed base body; a movable base body provided opposite to the fixed base body, wherein the movable base body is provided with at least two receiving holes to correspondingly receive the at least two guide rods, and the movable base body slides along the at least two guide rods relative to the fixed base body; at least one correction mechanism located between the movable base body and the guide rail to adjust a movement of the movable base body in a vertical direction, wherein a first predetermined value exists between one of the at least two guide rods and an inner wall of a corresponding one of the at least two receiving holes, a second predetermined value exists between the movable base body and the correction mechanism, and a third predetermined value exists between the correction mechanism and the guide rail; and at least one sensor electrically connected to a controller, wherein the controller correspondingly controls the correction mechanism by determining whether corresponding detecting values of the sensor match with at least one of the first predetermined value, the second predetermined value and the third predetermined value, wherein the first predetermined value is at least one of a first predetermined clearance value and a first predetermined contact force value, the second predetermined value is at least one of a second predetermined clearance value and a second predetermined contact force value, and the third predetermined value is at least one of a third predetermined clearance value and a third predetermined contact force value.

In certain embodiments, the sensor is a clearance sensor, the clearance sensor is provided on the movable base body or the one of the guide rods or the correction mechanism or the guide rail, and at least one of a clearance value between the one of the at least two guide rods and the inner wall of the corresponding one of the at least two receiving holes, a clearance value between the movable base body and the correction mechanism, and a clearance value between the correction mechanism and the guide rail being detected by the clearance sensor is equal to or greater than zero; or the sensor is a force sensor, the force sensor is provided on the movable base body or the one of the guide rods or the correction mechanism or the guide rail, and at least one of a contact force value between the one of the at least two guide rods and the inner wall of the corresponding one of the at least two receiving holes, a contact force value between the movable base body and the correction mechanism, and a contact force value between the correction mechanism and the guide rail being detected by the force sensor is equal to or greater than zero; or the sensor is a strain sensor, the strain sensor is provided on the one of the guide rods, and the strain sensor detects a deformation amount of the one of the guide rods.

In certain embodiments, the clearance sensor or the force sensor is provided on the inner wall of the corresponding one of the at least two receiving holes and corresponds to a lower side of the one of the guide rods.

In certain embodiments, the movable base body is provided with a guide sleeve sleeved over the one of the guide rods, the guide sleeve is located inside the corresponding one of the receiving holes, and the clearance sensor or the force sensor is provided on guide sleeve.

In certain embodiments, each of the guide rods is provided with a plurality of strain sensors, and the strain sensors are arranged along a straight line along an axial direction of the guide rods.

In certain embodiments, the sensor is a clearance sensor, the movable base body has a movable mold base and a first mold fixed and connected to one end of the movable mold base close to the fixed base body, and the clearance sensor is provided between the movable mold base and the fixed base body and is adjacent to the first mold.

In certain embodiments, the clearance sensor is a contact-type clearance sensor, the correction mechanism is fixed and connected to the movable base body, the correction mechanism has a lower supporting member sliding along the guide rail in association with the movable base body, and the contact-type clearance sensor is provided on the lower supporting member and in contact with a lower end of the one of the guide rods.

In certain embodiments, a movable mold driving mechanism is fixed to one end of the rack away from the fixed base body, one end of a guide post is connected to the movable mold driving mechanism and drives the reciprocal movement of the movable base body, and the sensor is a torsion sensor and is provided on the guide post or the movable mold driving mechanism.

In certain embodiments, the correction mechanism is fixed below the movable base body and slides along the guide rail in association with the movable base body, the correction mechanism has an upper supporting member fixed and connected to the movable base body and a correction driving mechanism connected to the upper supporting member, and the correction driving mechanism drives the upper supporting member to adjust the movement of the movable base body in the vertical direction.

In certain embodiments, when the correction driving mechanism is a correction motor, the correction mechanism has a lower supporting member sliding along the guide rail in association with the movable base body, the upper supporting member is located between the lower supporting member and the movable base body, and the correction motor is fixed to the lower supporting member and drives the upper supporting member to adjust the movement of the movable base body in the vertical direction; and when the correction driving mechanism is an air cylinder or an oil cylinder, the air cylinder or the oil cylinder has at least one accommodating cavity and a piston provided between the upper supporting member and the lower supporting member, the piston is received correspondingly in the accommodating cavity, and the piston is connected to the upper supporting member and drives the upper supporting member to adjust the movement of the movable base body in the vertical direction.

In certain embodiments, the injection molding machine device includes two sensors, wherein the movable base body has a gravity center, one of the two sensors is located closer to the fixed base body than the other of the two sensors, the correction mechanism has a correction driving mechanism located at one side of the gravity center close to the fixed base body to drive the movement of the movable base body in the vertical direction.

An injection molding machine device includes: a rack; at least one guide rail fixed to the rack; at least two guide rods, wherein one of two ends of each of the at least two guide rods is fixed to the rack; a fixed base body fixed to one end of the rack, wherein the other of the two ends of each of the at least two guide rods is fixed to the fixed base body; a movable base body provided directly opposite to the fixed base body, wherein the movable base body is provided with at least two receiving holes to correspondingly receive the at least two guide rods, the movable base body slides along the at least two guide rods relative to the fixed base body, and the movable base body has a predetermined tilting angle value; at least one correction mechanism located between the movable base body and the guide rail to adjust a movement of the movable base body in a vertical direction and to adjust a tilting angle of the movable base body; and at least one sensor electrically connected to a controller, wherein the controller correspondingly controls the correction mechanism by determining whether a corresponding detecting value of the sensor matches with the predetermined tilting angle value.

In certain embodiments, the sensor is a tilting angle sensor; or the injection molding machine device comprises at least two sensors provided at intervals along a sliding direction of the movable base body or the vertical direction, the controller correspondingly controls the correction mechanism by determining whether corresponding detecting values of the two sensors match with the predetermined tilting angle value.

In certain embodiments, the predetermined tilting angle value is zero, one of the two sensors is located closer to the fixed base body than the other of the two sensors, and the two sensors are located at a same horizontal level.

In certain embodiments, the sensors are clearance sensors, the two clearance sensors detect a first clearance value between one of the at least two guide rods and an inner wall of a corresponding one of the at least two receiving holes, or a second clearance value between the movable base body and the correction mechanism, or a third clearance value between the correction mechanism and the guide rail, and the controller obtains a tilting angle value of the movable base body according to at least one of a clearance variation amount of the first clearance value, a clearance variation amount of the second clearance value and a clearance variation amount of the third clearance value detected by the two clearance sensors; or the sensors are height sensors, and the controller obtains the tilting angle value of the movable base body according to height variation amounts of the two clearance sensors at different heights.

In certain embodiments, the movable base body has a gravity center, the correction mechanism has a correction driving mechanism located at one side of the gravity center close to the fixed base body to adjust the tilting angle of the movable base body.

In certain embodiments, the correction mechanism is fixed below the movable base body and slides along the guide rail in association with the movable base body, the correction mechanism has two correction driving mechanisms respectively located at two sides of the gravity center along a sliding direction of the movable base body, the two correction driving mechanisms respectively adjust the tilting angle of the movable base body, the correction mechanism has an upper supporting member, and the two correction driving mechanisms drive the upper supporting member to adjust the tilting angle of the movable base body.

In certain embodiments, the correction mechanism has a lower supporting member sliding along the guide rail in association with the movable base body; when at least one of the correction driving mechanisms is a correction motor, the upper supporting member is located between the lower supporting member and the movable base body, and the correction motor is fixed to the lower supporting member and drives the upper supporting member to adjust the movement of the movable base body in the vertical direction; and when at least one of the correction driving mechanisms is an air cylinder or an oil cylinder, the air cylinder or the oil cylinder has at least one accommodating cavity and a piston provided between the upper supporting member and the lower supporting member, the piston is received correspondingly in the accommodating cavity, and the piston is connected to the upper supporting member and drives the upper supporting member to adjust the movement of the movable base body in the vertical direction.

In certain embodiments, the movable base body has two supporting positions respectively located at two sides of the gravity center along a sliding direction of the movable base body, the correction mechanism has two correction driving mechanisms respectively provided corresponding to the two supporting positions, and the two correction driving mechanisms individually apply supporting forces upward to the two supporting positions to correspondingly adjust the tilting angle of the movable base body.

In certain embodiments, the movable base body has a movable mold base and a first mold fixed and connected to one end of the movable mold base close to the fixed base body, one side of the movable mold base close to the fixed base body has an end surface, an extending portion is fixed to the movable mold base or is integrally formed with the movable mold base, the extending portion passes beyond the end surface and extends to be located between the gravity center and the fixed base body, one of the two supporting positions is located on the extending portion and located at one side of the gravity center close to the fixed base body, and the correction driving mechanism is located below the extending portion corresponding to the supporting positions.

In certain embodiments, the correction mechanism has an adjusting mechanism and at least one correction driving mechanism, the adjusting mechanism is connected to the correction driving mechanism to adjust the correction driving mechanism to move reciprocally along a sliding direction of the movable base body, and the correction driving mechanism correspondingly adjust the tilting angle of the movable base body.

In certain embodiments, the correction mechanism has an upper supporting member, the adjusting mechanism comprises an adjusting motor and an adjusting screw bolt connected to the adjusting motor, the adjusting motor and the upper supporting member are both fixed to the movable base body, the adjusting screw bolt is connected to the correction driving mechanism to adjust the correction driving mechanism to move reciprocally along the sliding direction of the movable base body.

Compared with the related art, certain embodiments of the present invention has the following beneficial effects:

By providing the sensor to detect the clearances or contact forces between different components, and providing the predetermined clearance values or the predetermined contact force values corresponding to the sensor, the controller may correspondingly control the correction mechanism to adjust the movable base body by determining whether corresponding detecting values of the sensor match with the predetermined values, thereby knowing whether the movable base body generates an acting force to the guide rods real-time and accurately, and correspondingly adjust the movable base body to reduce the acting force applied to the guide rods, thus facilitating automation control without manual adjustments, reducing the adjusting error of the correction mechanism such that the correction mechanism adjusts the height of the movable base body more accurately, knowing the sinking height or tilting degree of the movable base body real-time and accurately without obtaining the adjustment height of the movable base body by manual estimation or repeated testing, reducing human cost and increasing production efficiency, such that the adjustment height of the movable base body matches with the actual sinking height and tilting height, significantly reducing the acting force by the movable base body to the guide rods such that the wear of the movable base body and the guide rods is reduced, enhancing the usage life of the guide rods and the movable base body, and correspondingly enhancing the life of the injection molding machine device. Further, when multiple sensors are provided, the controller may perform determination according to the detecting values of the sensors and correspondingly control the correction mechanism, such that the moving position of the movable base body is more accurate by multiple determinations.

These and other aspects of the present invention will become apparent from the following description of the preferred embodiment taken in conjunction with the following drawings, although variations and modifications therein may be effected without departing from the spirit and scope of the novel concepts of the disclosure.

BRIEF DESCRIPTION OF THE DRAWINGS

The accompanying drawings illustrate one or more embodiments of the disclosure and together with the written description, serve to explain the principles of the disclosure. Wherever possible, the same reference numbers are used throughout the drawings to refer to the same or like elements of an embodiment, and wherein.

DETAILED DESCRIPTION

Figure 1:
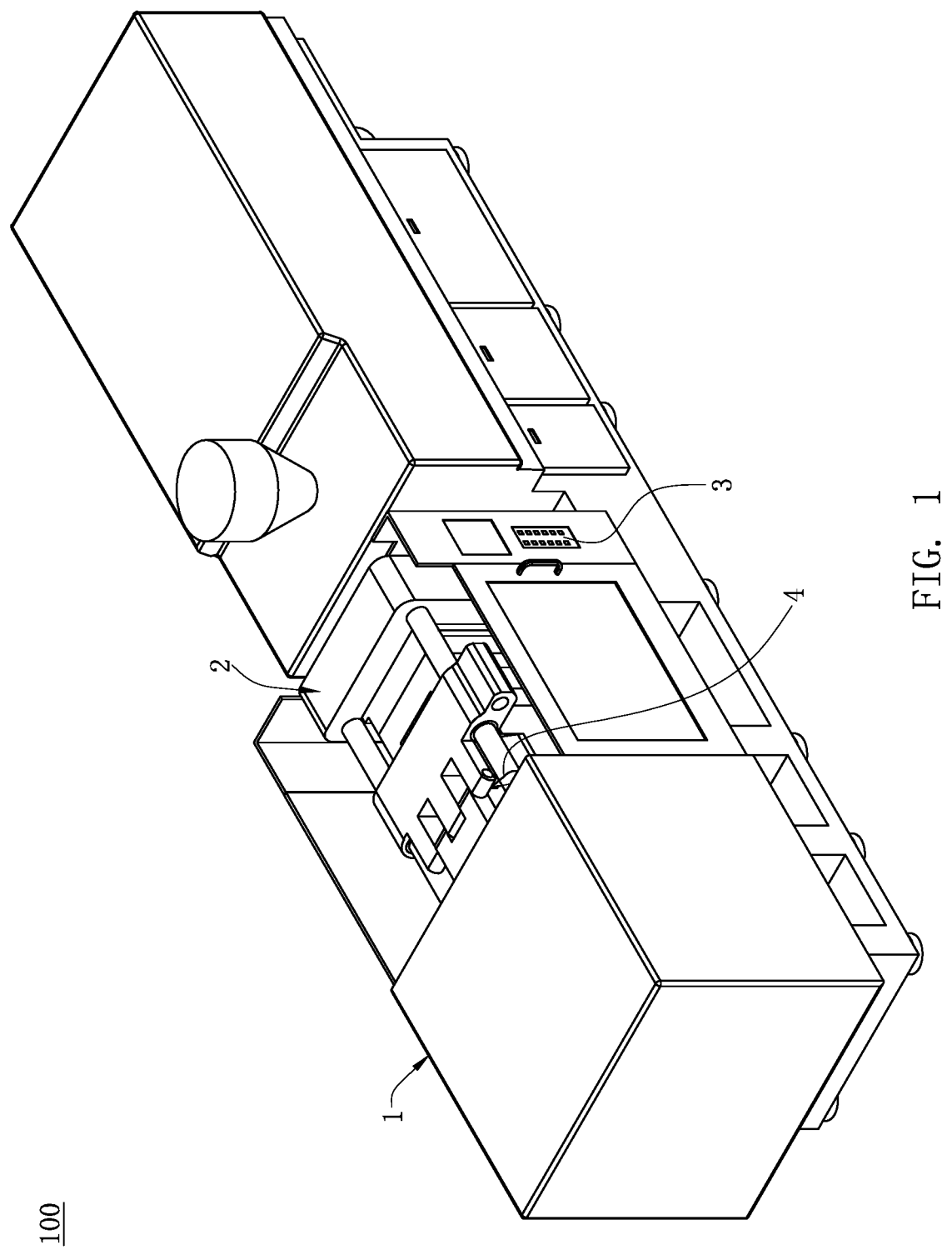
FIG. 1 is a perspective view of an injection molding machine device according to certain embodiments of the present invention.

The present invention is more particularly described in the following examples that are intended as illustrative only since numerous modifications and variations therein will be apparent to those skilled in the art. Various embodiments of the invention are now described in detail. Referring to the drawings, like numbers indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present invention.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, the terms "comprising", "including", "carrying", "having", "containing", "involving", and the like are to be understood to be open-ended, i.e., to mean including but not limited to.

The description will be made as to the embodiments of the present invention in conjunction with the accompanying drawings in FIGS. 1-26. In accordance with the purposes of this invention, as embodied and broadly described herein, this invention, in one aspect, relates to an injection molding machine device.

Referring to FIG. 1 to FIG. 5, an injection molding machine device 100 according to certain embodiments of the present invention includes a shell 1 and a device body 2. A controller 3 is provided on the shell 1 to control the injection molding machine device 100. In other embodiments, the controller 3 can be provided at other locations. The device body 2 includes a rack 21, two guide rails 24 provided horizontally and directly facing each other (in other embodiments, only one guide rail 24 is provided), and four guide rods 25 (in other embodiments, two or three guide rods 25 are provided). Two adjacent guide rods 25 are provided to directly face each other. A fixed base body 22 is fixed to a right end of the rack 21. The fixed base body 22 includes a fixed mold base 221 fixed to the right end of the rack 21 and a second mold 222 fixed to the fixed mold base 221. One end of each guide rod 25 is fixed to a left end of the rack 21, and the other end of each guide rod 25 is fixed to the fixed mold base 221. A movable base body 23 is provided directly facing the fixed base body 22. The movable base body 23 includes a movable mold base 231 and a first mold 232 fixed and connected to one end of the movable mold base 231 close to the fixed base body 22. Four receiving holes 234 corresponding to the guide rods 25 are provided at the peripheral area of the movable mold base 231. In other embodiments, two or three receiving holes 234 can be provided to correspond to the quantity of the guide rods 25. The movable mold base 231 is provided with four guide sleeves 233 correspondingly sleeved over the guide rods 25. In other embodiments, two or three guide sleeves 233 can be provided to correspond to the quantity of the guide rods 25. The guide sleeves 233 are located in the receiving holes 234. A movable mold driving mechanism (not numbered) is fixed to one end of the rack 21 away from the fixed base body 22. The movable base body 23 slides back and forth on the guide rods 25 relative to the fixed base body 22 by the action of the movable mold driving mechanism to facilitate closing and opening of the mold. The movable mold driving mechanism is a motor 26. In other embodiments, the movable mold driving mechanism can be an air cylinder or an oil cylinder. One end of a guide post is connected to the motor 26 to drive the movable base body 23 to move reciprocally, and the guide post is a screw bolt 27. Two correction mechanisms 28 (in other embodiments, one correction mechanism 28 or other amounts of corrections mechanisms 28 can be provided) are fixed below the movable base body 23, and located between the movable base body 23 and the guide rails 24 (in other embodiments, the correction mechanisms 28 can be provided above the movable base body 23) to support the weight of the movable base body 23. The correction mechanisms 28 are connected to a controller 3 to adjust the movement of the movable base body 23 in a vertical direction, and slide along the guide rails 24 in association with the movable base body 23, thus reducing the action of the weight of the movable base body 23 to the guide rods 25. A sensor 29 is connected to the controller 3. The controller 3 determines whether the movable base body 23 is sinking and whether the movable base body 23 generates an acting force to the guide rods 25 according to detecting values of the sensor 29, thereby correspondingly controlling the correction mechanisms 28 to adjust the movement of the movable base body 23 in the vertical direction. By providing the sensor 29, it is possible to know the sinking height or tilting degree of the movable base body 23 real-time and accurately, such that the adjustment height of the movable base body 23 matches with the actual sinking height and tilting height, thereby reducing or eliminating the wear between the connecting mechanisms, and enhancing the usage life of the guide rods 25 and the movable base body 23.

Figure 3:
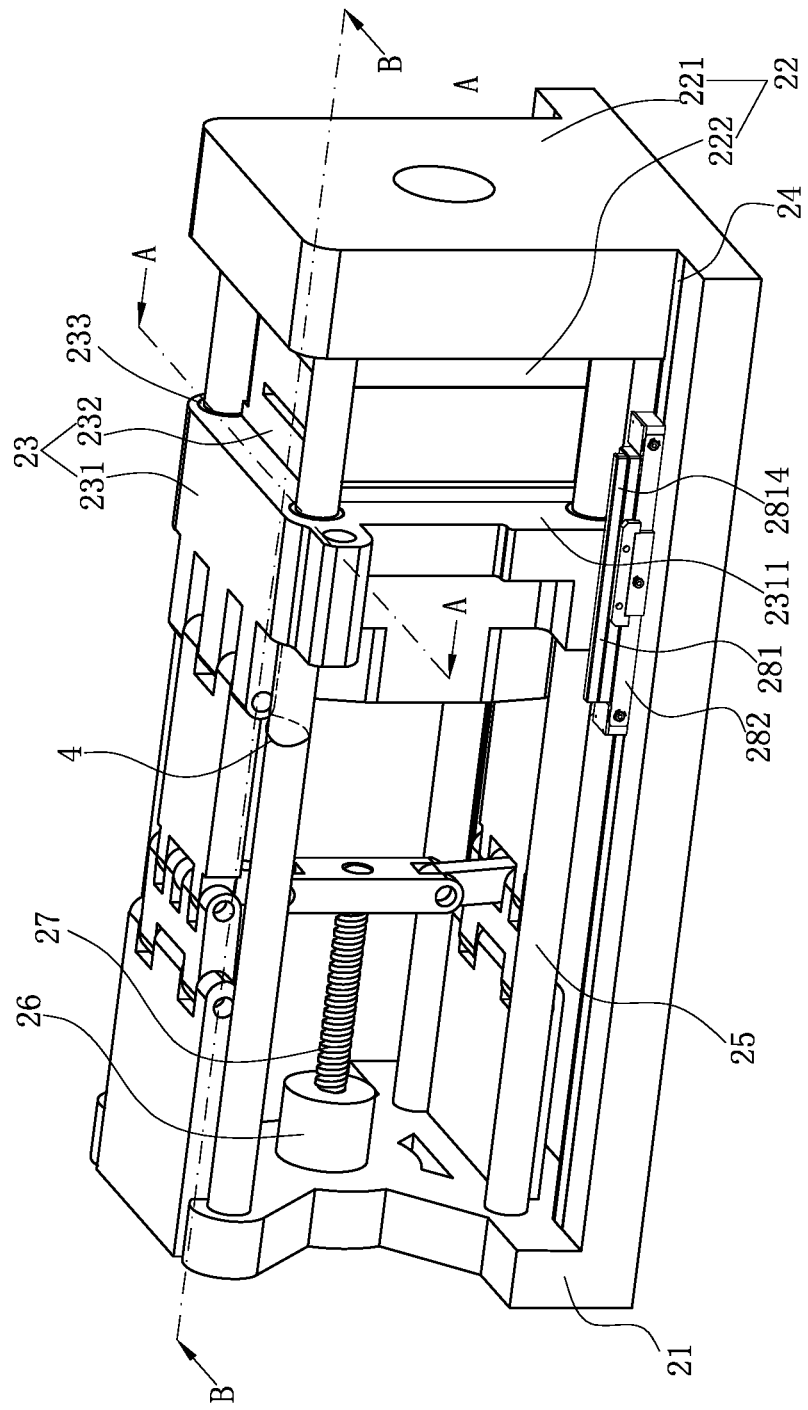
FIG. 3 is a perspective view of a device body in FIG. 1.
Figure 6:
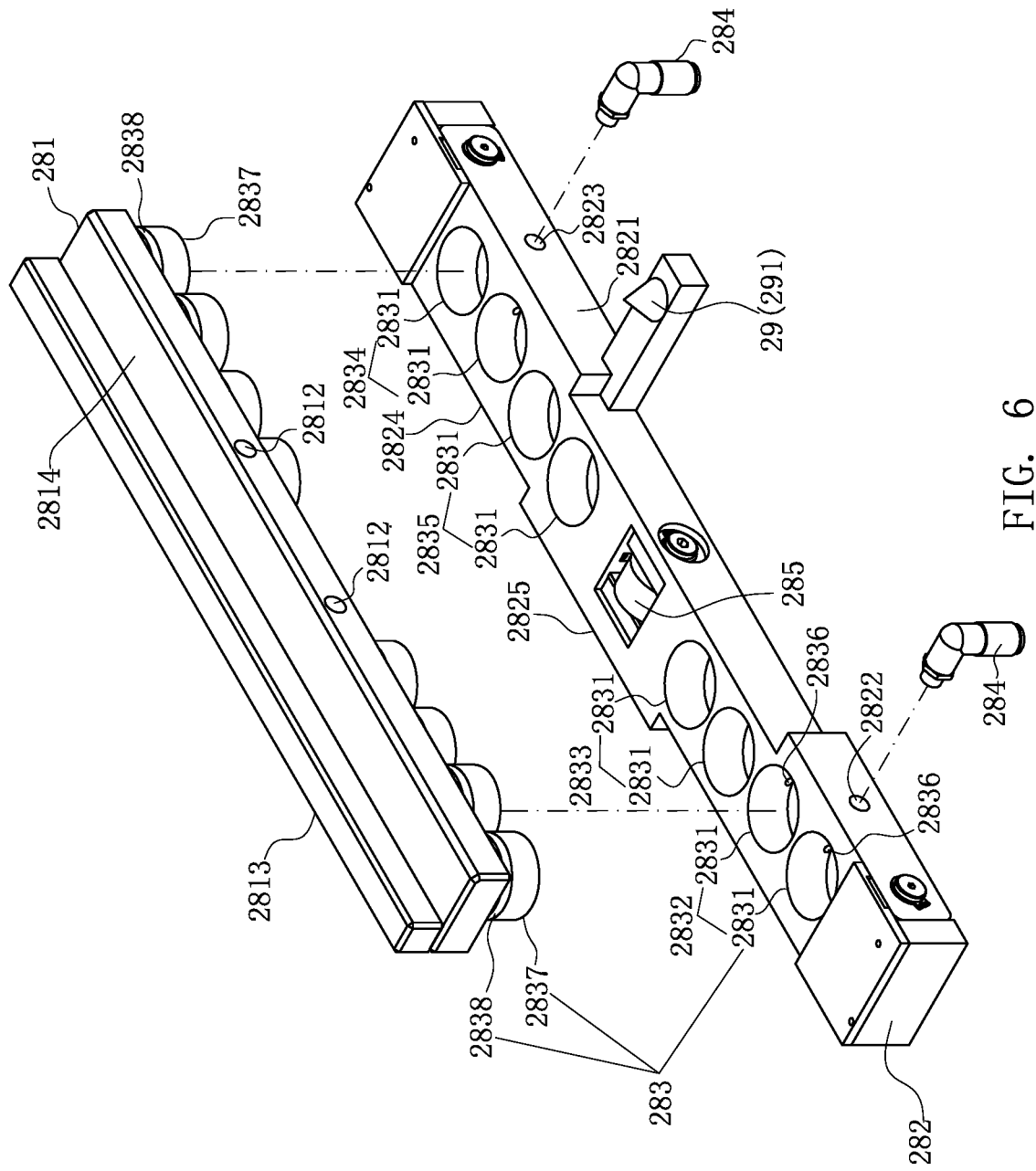
FIG. 6 is a perspective exploded view of a correction mechanism according to certain embodiments of the present invention.
Figure 7:
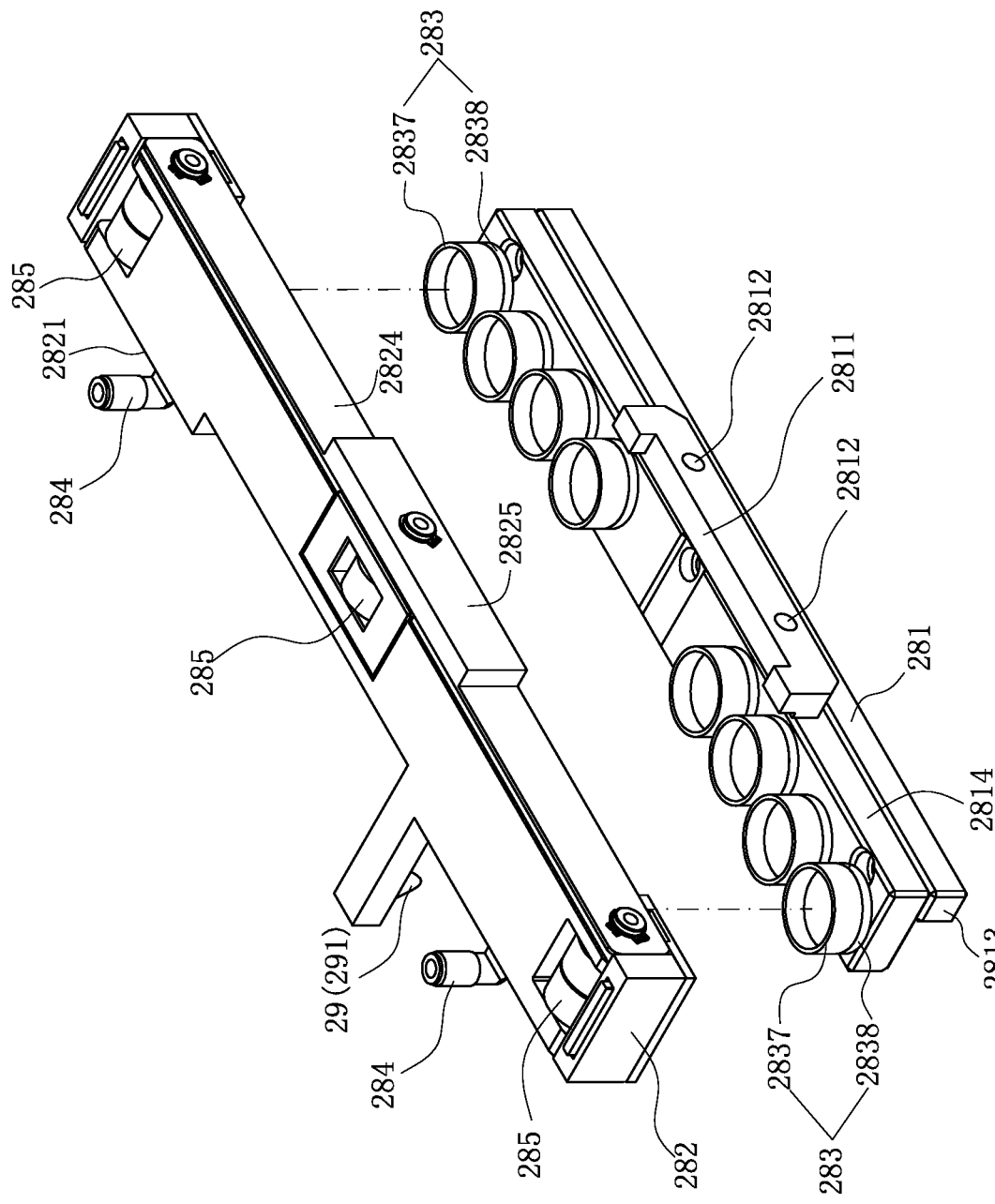
FIG. 7 is a perspective exploded view of a correction mechanism from another viewing angle according to certain embodiments of the present invention.

As shown in FIG. 3, FIG. 6 and FIG. 7, each of the correction mechanisms 28 has an upper supporting member 281 (in other embodiments, two or more upper supporting members 281 may be provided), which is fixed to the movable mold base 231 and slides over the guide rails 24 in association with the movable base body 23. The movable mold base 231 has an end surface 2311, and one end of the upper supporting member 281 close to the fixed base body 22 has an extending portion 2814 passing beyond the end surface 2311. In other embodiments, the extending portion 2814 may be fixed to the movable mold base 231 or be integrally formed with the movable mold base 231, such that the correction mechanisms 28 generate acting forces to the movable base body 23. The extending portion 2814 corresponds to a lower side of the first mold 232. Each of the correction mechanisms 28 further has a lower supporting member 282 located above the guide rails 24 and below the upper supporting member 281 to slide along the guide rails 24 in association with the movable base body 23, and a plurality of correction driving mechanisms connected to the upper supporting member 281 and drives the upper supporting member 281 to adjust the movement of the movable base body 23 in the vertical direction. The movable base body 23 has a supporting position Q for being supported by the correction mechanisms 28. The correction driving mechanism applies a supporting force to the movable mold base at the supporting position Q to adjust the movement of the movable base body 23 in the vertical direction. The supporting position Q is a position corresponding to the acting force of the correction mechanisms 28 to the movable base body 23. The upper supporting member 281 and the lower supporting member 282 are both plate shaped structures, thus increasing the contact area of the movable base body 23, such that the movement of the movable base body 23 is more stable.

As shown in FIG. 6 and FIG. 7, the correction driving mechanisms are air cylinders 283. In other embodiments, the correction driving mechanisms can also be oil cylinders or correction motors. Each of the air cylinders 283 includes an accommodating cavity 2831 and a piston 2837 corresponding received in the accommodating cavity 2831. The piston 2837 is fixed to the upper supporting member 281 and drives the upper supporting member 281 to adjust the movement of the movable base body 23 in the vertical direction. In other embodiments, the piston 2837 can abut or be in other types of connection with the upper supporting member 281. The lower supporting member 282 is provided with a plurality of receiving cavities 2831. In other embodiments, only one accommodating cavity 2831 is provided, and the accommodating cavity 2831 can be provided on the upper supporting member 281 or between the upper supporting member 281 and the lower supporting member 282.

As shown in FIG. 6 and FIG. 7, the upper supporting member 281 is located above the accommodating cavities 2831, and one side wall thereof is provided with a clamping portion 2811. A side wall of the clamping portion 281 is provided with two through holes 2812 to receive the fixing members (not shown) fixing the upper supporting member 281 and the movable base body 23, and an upper surface thereof is fixedly provided with an additional plate 2813 to shield and protect the bottom edge of the side wall of the movable base body 23.

Figure 8:
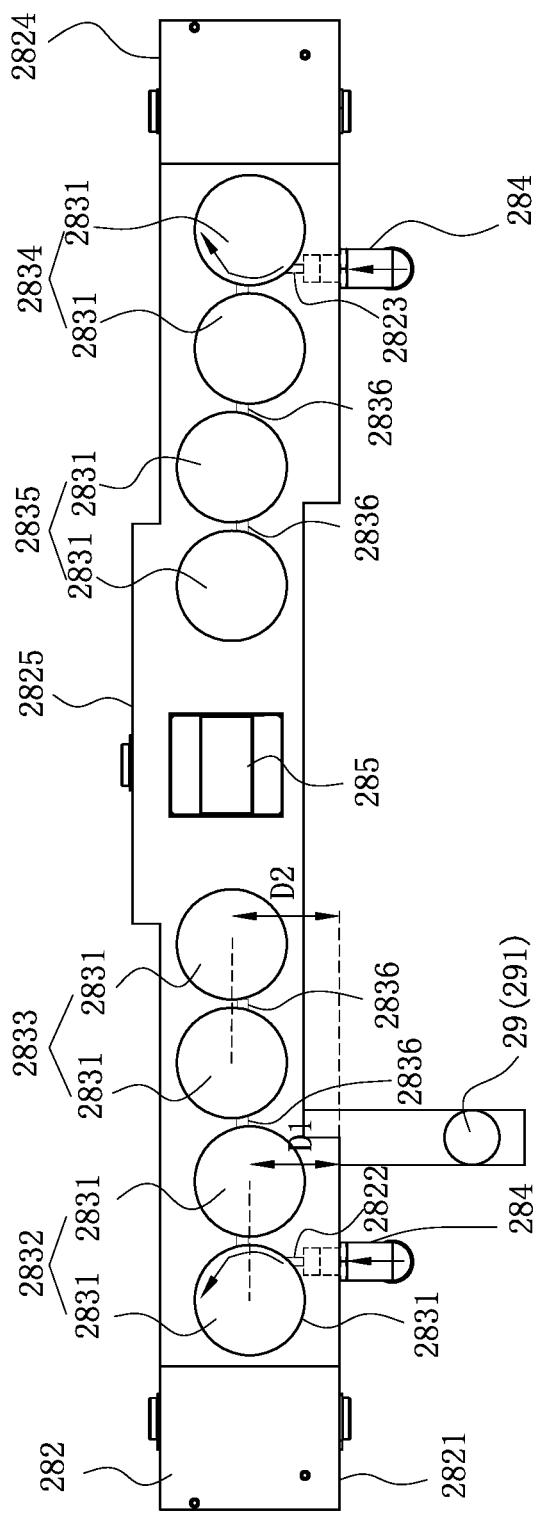
FIG. 8 is a schematic view of components of a correction mechanism according to certain embodiments of the present invention.

As shown in FIG. 6 to FIG. 8, a second side wall 2824 of the lower supporting member 282 is provided with a protruding portion 2825 corresponding to the clamping portion 2811, and the protruding portion 2825 matches with the clamping portion 2811. Eight accommodating cavities 2831 are provided, and each two of the accommodating cavities 2831 form an accommodating cavity group. In a width direction of the lower supporting member 282, the two accommodating cavities 2831 of each accommodating cavity group are equally distanced from a first side wall 2821 of the lower supporting member 282, and a distance D1 from a first accommodating cavity group 2832 to the first side wall 2821 is less than a distance D2 from a second accommodating cavity group 2833. In a length direction of the lower supporting member 282, the first accommodating cavity group 2832 and a third accommodating cavity group 2834 are symmetrical, and the second accommodating cavity group 2833 and a fourth accommodating cavity group 2835 are symmetrical. The third accommodating cavity group 2834 and a portion of the fourth accommodating cavity group 2835 are located below the extending portion 2814. Eight air cylinders 283 are provided, and eight pistons 2837 are correspondingly provided. The eight pistons 2837 are respectively mounted in the accommodating cavities 2831. The controller 3 drives the air cylinders 283 to adjust the movement of the movable base body 23 in the vertical direction, and the air cylinders 283 are provided symmetrically to ensure the movable base body 23 are applied with balanced forces.

As shown in FIG. 6 and FIG. 7, a washer 2838 is provided between each piston 2837 and the upper supporting member 282, preventing the pistons 2837 from being in direct contact with the upper supporting member 282 and wear, and prolonging the usage life of the pistons 2837.

As shown in FIG. 6 and FIG. 8, in each accommodating cavity group, a venting hole 2836 is provided between the two accommodating cavities 2831. A venting hole 2836 is provided between the two adjacent accommodating cavities 2831 in the first accommodating cavity group 2832 and the second accommodating cavity group 2833, and a venting hole 2836 is provided between the two adjacent accommodating cavities 2831 in the third accommodating cavity group 2834 and the fourth accommodating cavity group 2835. A first air inlet 2822 and a second air inlet 2823 are respectively provided at the left side and the right side of the first side wall 2821 of the lower supporting member 282. The first air inlet 2822 is in communication with the accommodating cavity 2831 located at the leftmost side of the lower supporting member 282, and the second air inlet 2823 is in communication with the accommodating cavity 2831 located at the rightmost side of the lower supporting member 282. By the first air inlet 2822 and the venting holes 2836 in the first accommodating cavity group 2832 and the second accommodating cavity group 2833, air pressure can be provided to the four air cylinders 283 located at the left side of the lower supporting member 282. By the second air inlet 2823 and the venting holes 2836 in the third accommodating cavity group 2834 and the fourth accommodating cavity group 2835, air pressure can be provided to the four air cylinders 283 located at the right side of the lower supporting member 282.

As shown in FIG. 6 to FIG. 8, the two sides and the center of the lower supporting member 282 are provided rolling bearings 285 (in other embodiments, roller wheels or other rolling members may be installed instead of the rolling bearings 285). The roller bearings 285 roll on the upper surface of the guide rails 24, reducing the resisting force of the correction mechanisms 28 moving back and forth on the guide rails 24.

Figure 2:
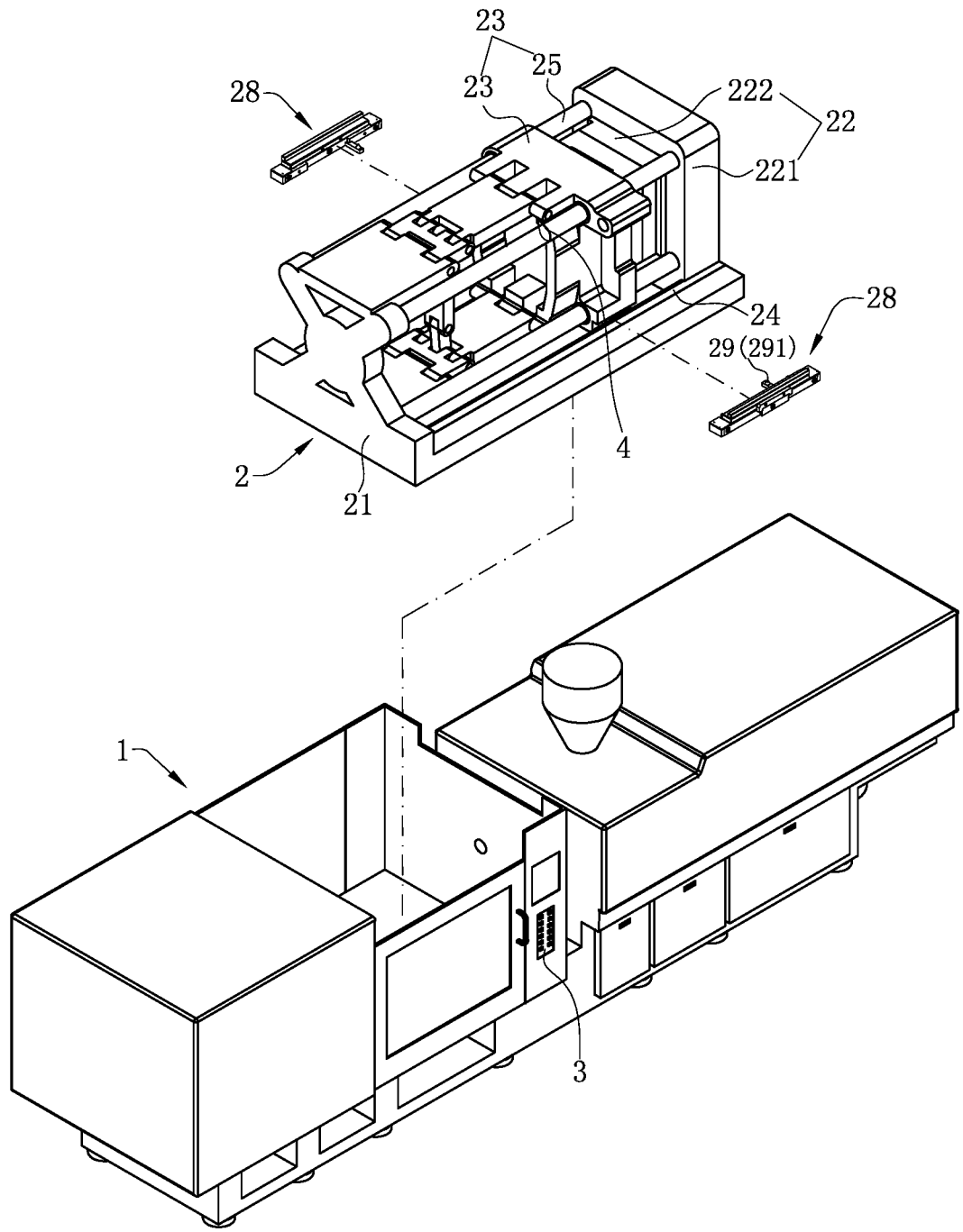
FIG. 2 is a perspective exploded view of an injection molding machine device according to certain embodiments of the present invention.

As shown in FIG. 1 and FIG. 2, a level dial indicator 4 is provided below the movable base body 23 (in other embodiments, other testing meters for detecting the height can be used). When the height of the movable base body 23 in the vertical direction is adjusted by air pressure, the dial indicator 4 can detect the height of the movable base body 23, thus controlling the incoming air amount and adjusting the movable base body 23 to the appropriate height.

As shown in FIG. 6 to FIG. 8, each of the first air inlet 2822 and the second air inlet 2823 respectively receives an inlet pipe 284. Another end of the inlet pipe 284 is provided with a back pressure valve (not shown) to prevent the air pressure in the air cylinders 283 from reducing to cause the height of the movable base body 23 to decrease, thereby stabilizing the height of the movable base body 23, and ensuring the precision of the injection molding products.

Figure 4:
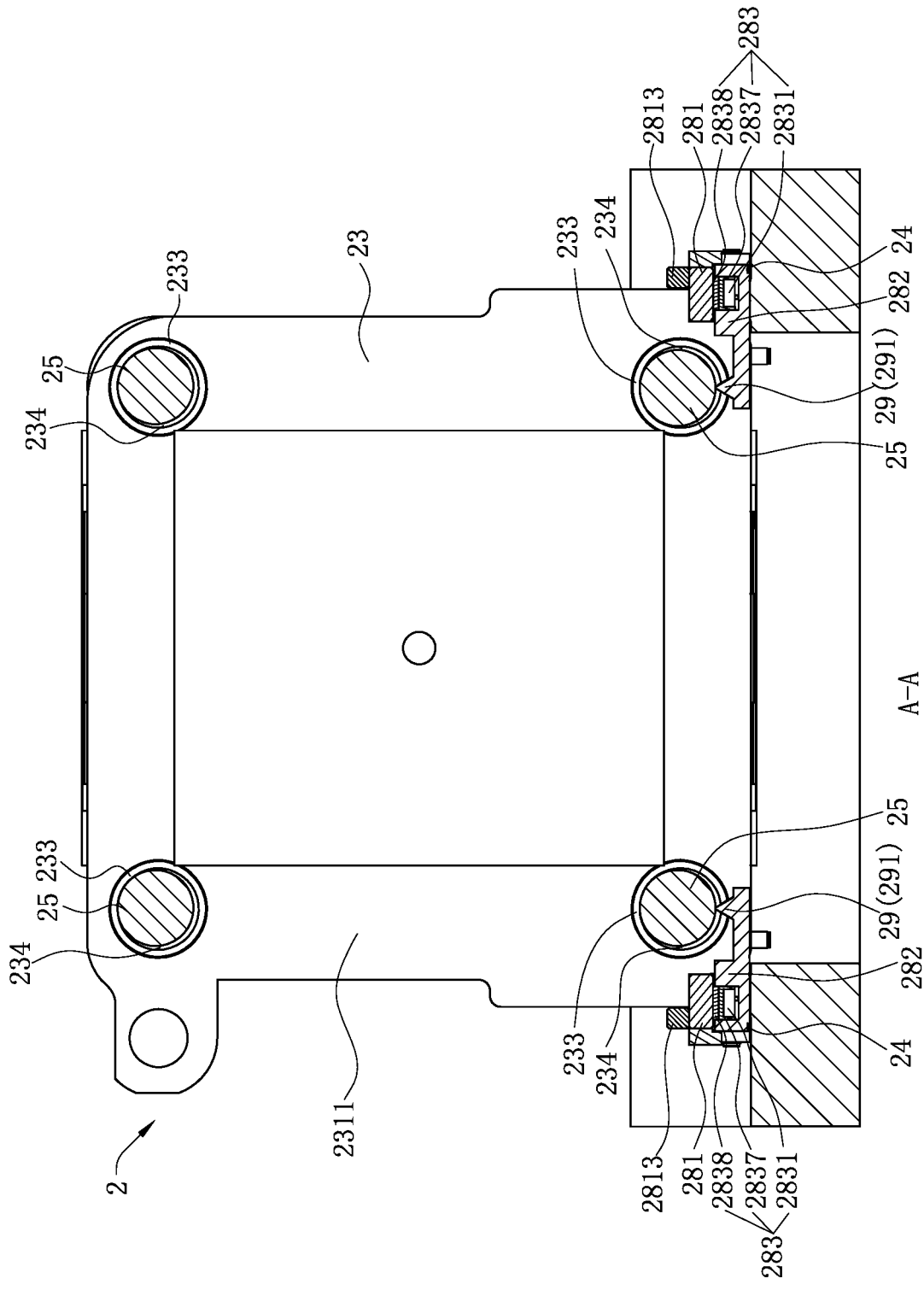
FIG. 4 is a sectional view of FIG. 3 along the A-A direction.
Figure 5:
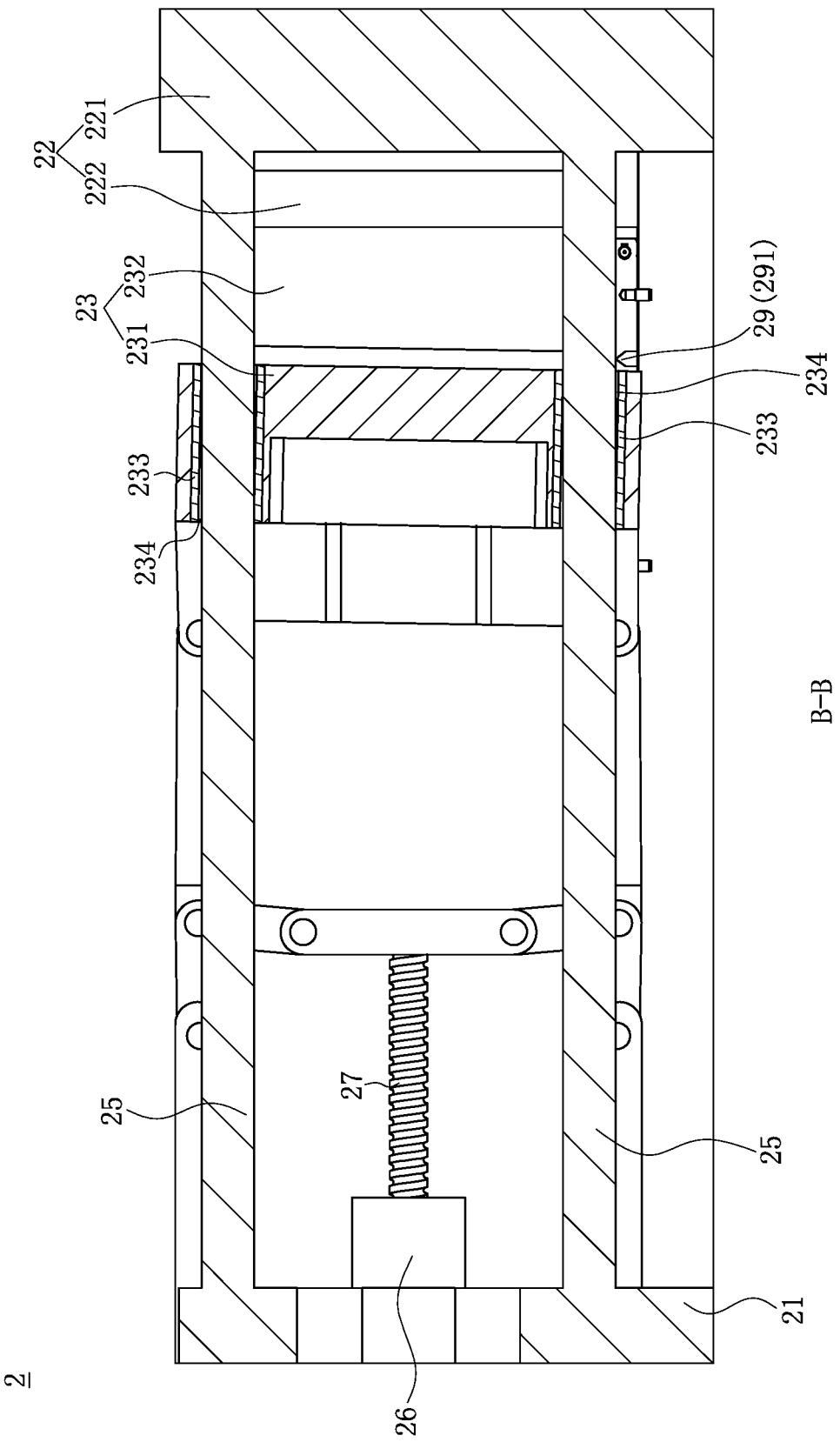
FIG. 5 is a sectional view of FIG. 3 along the B-B direction.

As shown in FIG. 4 to FIG. 6, the sensor 29 is a clearance sensor 291. The clearance sensor 291 is used to detect the clearances between the guide rods 25 and the inner walls of the corresponding receiving holes 234, thereby obtaining the corresponding detecting values. The clearance sensor 291 is provided outside the movable base body 23 to facilitate mounting of the clearance sensor 291. In this case, the clearance value between the clearance sensor 291 and the guide rods 25 being detected by the clearance sensor 291 is equal to or greater than zero. In other embodiments, the clearance sensor 291 may also be provided on the movable base body 23, such as being provided on the inner walls of the receiving holes 234 or on the guide rods 25, in order to directly detect the clearances between the guide rods 25 and the inner walls of the corresponding receiving holes 234.

In this embodiment, one clearance sensor 291 is provided, which is a contact-type clearance sensor 291. In other embodiments, multiple clearance sensors 291 can be provided, and the controller 3 may reduce the detection error by multiple determinations, such that the detecting result becomes more accurate. The contact-type clearance sensor 291 facilitates saving of the mounting space thereof. The contact-type clearance sensor 291 is provided between the movable base body 23 and the fixed base body 22 and is adjacent to the first mold 232, and is provided on the lower supporting member 282 and in contact with the lower end of the guide rods 25. In other embodiments, the clearance sensor 291 can be a non-contact type clearance sensor 291 located below the guide rods 25 without being in contact with the guide rods 25, such as an infrared distance measuring sensor, and the clearance sensor 291 can also be provided above the guide rods 25. Thus, the clearance sensor 291 may detect the clearance values between the guide rods 25 and the corresponding receiving holes 234.

The one side of the movable base body 23 having the first mold 232 has a greater weight. Thus, each of the guide rods 25 receives a greater downward acting force at the end adjacent to the first mold 232, such that the deformation amounts of the guide rods 25 are relatively larger, the clearance variation detected by the clearance sensor 291 becomes more significant, and the detecting result becomes more intuitive and accurate. Correspondingly, the adjustment of the correction mechanism 28 to the movable base body 23 is more accurate. In addition, the lower ends of the guide rods 25 are the positions of the guide rods 25 having greater deformation amounts, which may significantly obtain the variation amounts of the clearances. The clearance sensor 291 is mounted on the correction mechanisms 28, facilitating the mounting of the clearance sensor 291 and the electronic line arrangements correspondingly with the correction mechanisms 28. The clearance sensor 291 slides on the guide rails 24 with the correction mechanisms 28. In the process, the clearance sensor 291 detects the deformation amounts of the guide rods 25 at different positions of the guide rods 25, such that the controller 3 correspondingly controls the correction mechanisms 28 to adjust the movement of the movable base body 23 in the vertical direction in the sliding process, thus reducing the acting force applied to the guide rods 25 in the sliding process of the movable base body 23, such that the guide rods 25 are protected in the longer stroke, further enhancing the usage life of the guide rods 25 and the movable base body 23, and allowing the movable base body 23 and the fixed base body 22 to direct act in closing the mold without waiting for the adjustment of the movable base body 23, and enhancing the production efficiency.

Figure 9:
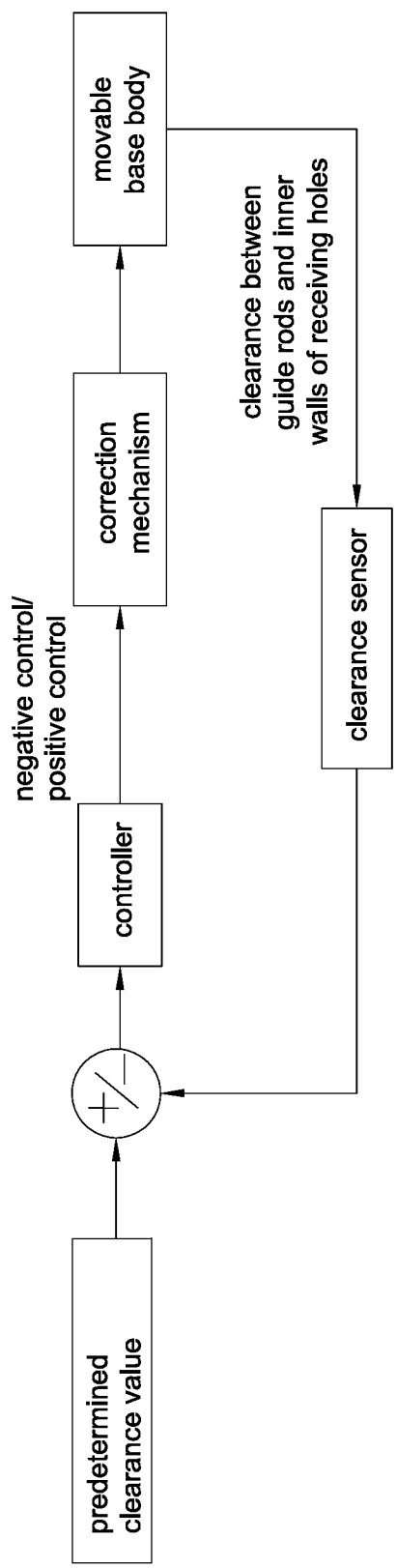
FIG. 9 is a control flowchart when the sensor is a clearance sensor according to certain embodiments of the present invention.

As shown in FIG. 9, a predetermined clearance value exists between the guide rods 25 and the inner walls of the corresponding receiving holes 234. The predetermined clearance value is a base value configured in the controller 3 for the case when the movable base body 23 does not generate an acting force to the guide rods 25. The predetermined clearance value can be a single value or a range value, which is based on the movable base body 23 not generating an acting force to the guide rods 25. The movable base body 23 sinks or tilts due to the gravity, such that the guide rods 25 are applied with forces and deform, and the clearances between the guide rods 25 and the inner walls of the corresponding receiving holes 234 change. Thus, the controller 3 determines whether the corresponding detecting values of the clearance sensor 291 match with the predetermined clearance value to correspondingly control the correction mechanisms 28. For example, the predetermined clearance value is set to be 0.05-0.08. When the clearance sensor 291 detects the clearance value between the guide rods 25 and the inner walls of the corresponding receiving holes 234 to be less than 0.05, the controller 3 determines that the movable base body 23 is sinking. Thus, the controller 3 correspondingly controls the correction driving mechanism to drive the upper supporting member 281, thus adjusting the movable base body 23 to move upward as a whole until the detecting value of the clearance sensor 291 is in the range of 0.05-0.08. Similarly, when the clearance sensor 291 detects the clearance value between the guide rods 25 and the inner walls of the corresponding receiving holes 234 to be greater than 0.08, the controller 3 correspondingly controls the correction driving mechanism to adjust the movable base body 23 to move downward as a whole until the detecting value of the clearance sensor 291 is in the range of 0.05-0.08. It should be noted that the controller 3 correspondingly adjusts the movable base body 23 according to the corresponding detecting values of the sensor 29, and the detecting values of the sensor 29 is variable. Thus, the adjusting process of the controller 3 to the movable base body 23 is dynamically changing.

Accordingly, by providing the clearance sensor 291, it is possible to know the sinking height or tilting degree of the movable base body 23 real-time and accurately without obtaining the adjustment height of the movable base body 23 by manual estimation or repeated testing, reducing human cost and increasing production efficiency, such that the adjustment height of the movable base body 23 matches with the actual sinking height and tilting height, significantly reducing the acting force by the movable base body 23 to the guide rods 25, such that the wear of the movable base body 23 and the guide rods 25 is reduced, enhancing the usage life of the guide rods 25 and the movable base body 23.

Figure 24:
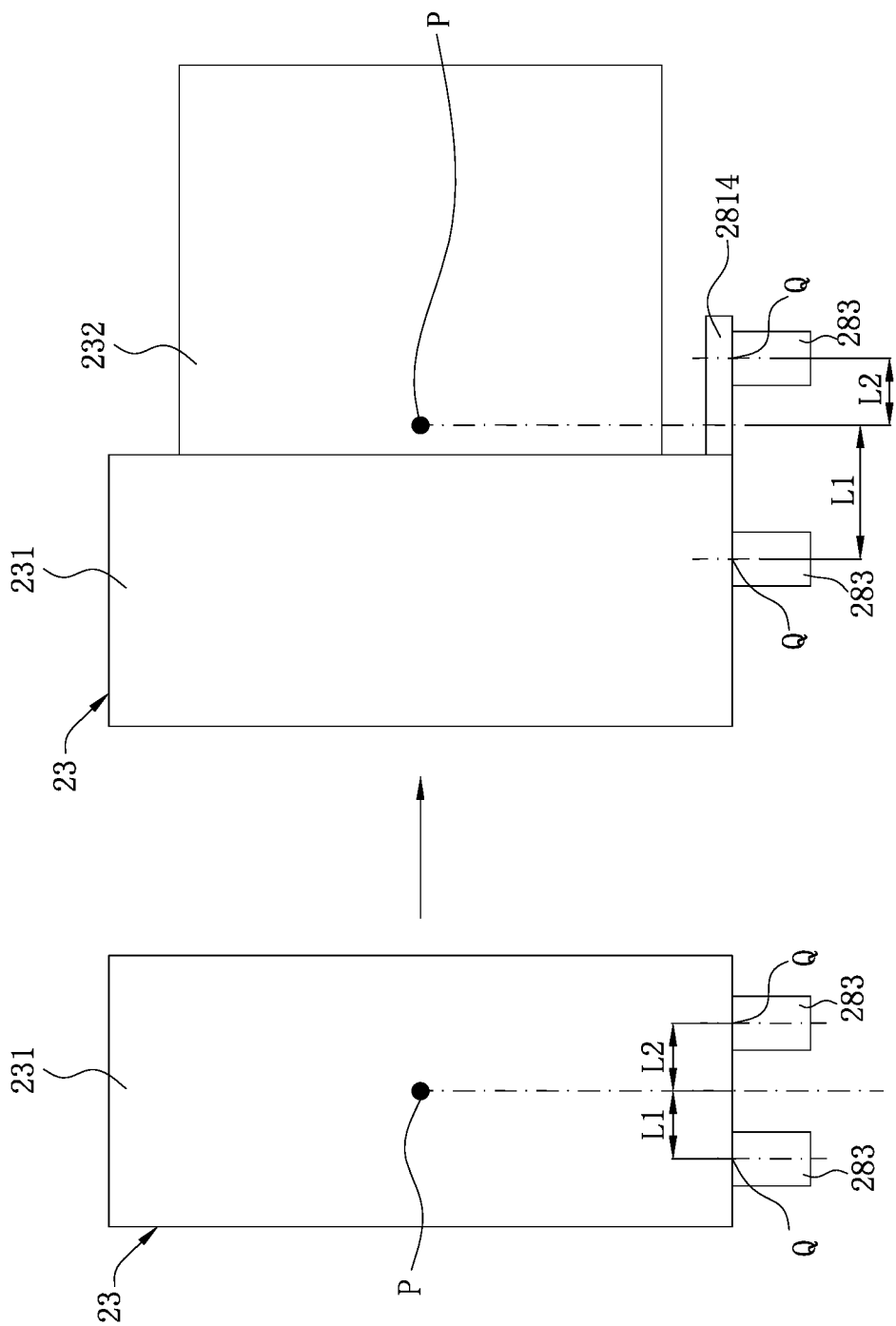
FIG. 24 is a schematic view showing the change of gravity center of the movable mold base without a first mold and with the first mold according to certain embodiments of the present invention.

As shown in FIG. 3 and FIG. 24, the movable base body 23 has a gravity center P. The extending portion 2814 at least partially extends to be located between the gravity center P and the fixed base body 22. The location of the gravity center P is variable. Taking the one end of the movable base body 23 connecting to the movable mold driving mechanism as a fixed end, and the other end of the movable base body 23 close to the fixed base body 22 as a free end, the fixed end is applied with a binding force and is more stable relative to the free end. In this embodiment, the fixed base body 22 is located at the right side of the movable base body 23, such that the free end is located at the right side of the fixed end, the extending portion 2814 extends to the right side of the gravity center P, and one of the supporting positions Q is located on the extending portion 2814 and located at the right side of the gravity center P. The air cylinder 283 located at the right side of the gravity center P corresponds to the supporting position Q and is located below the extending portion 2814.

As shown in FIG. 9 and FIG. 24, it is configured that the weight of the movable mold base 231 is 200 N, and the weight of the first mold 232 is 300 N. When the movable base body 23 does not have the first mold 232, the gravity center P of the movable base body 23 is the gravity center P of the movable mold base 231. When the movable base body 23 sinks, to adjust the whole movement height of the movable base body 23, two of the supporting positions Q are respectively located at two sides of the gravity center P, and two of the air cylinders 283 correspond to the two supporting positions Q and are located below the extending portion 2814. In this case, the controller 3 controls the two air cylinders 283 to respectively drive the movable base body 23. Assuming a distance L1 between the supporting position Q located at the left side of the gravity center P and the gravity center P is 1 m, and a distance L2 between the supporting position Q located at the right side of the gravity center P and the gravity center P is 1 m, the controller 3 controls the two air cylinders 283 to provide balanced torques at the two sides of the gravity center P, such that the movable base body 23 moves upward as a whole, and a total supporting force of the air cylinders 283 at the two sides of the gravity center P to the movable base body 23 is greater than the weight of the movable base body 23. In other words, a supporting force of the air cylinder 283 at the left side of the gravity center P to the movable base body 23 can be 120 N, and a supporting force of the air cylinder 283 at the right side of the gravity center P to the movable base body 23 is correspondingly 120 N. Thus, the torques at the two sides of the gravity center P are equivalent and balanced to each other, and the total supporting force is greater than 200 N. When the movable base body 23 is adjusted such that the detecting value of the clearance sensor 291 is the predetermined clearance value, the supporting force of the air cylinder 283 at the left side of the gravity center P to the movable base body 23 can be 100 N, and the supporting force of the air cylinder 283 at the right side of the gravity center P to the movable base body 23 is correspondingly 100 N, thus ensuring the height of the movable base body 23 to be unchanged.

When the movable base body 23 has the first mold 232, the gravity center P of the movable base body 23 moves rightward relative to the gravity center P of the movable mold base 231. For description purposes, the location of the gravity center P is configured to be outside the movable mold base 231. To adjust and control the movable base body 23 to move upward as a whole, that is, to adjust the whole movement height of the movable base body 23 having the first mold 232, two of the supporting positions Q are respectively located at two sides of the gravity center P which has been moved rightward, and two of the air cylinders 283 correspond to the two supporting positions Q and are located below the extending portion 2814. In this case, the controller 3 controls the two air cylinders 283 to respectively drive the movable base body 23. Assuming a distance L1 between the supporting position Q located at the left side of the gravity center P and the gravity center P is 2 m, and a distance L2 between the supporting position Q located at the right side of the gravity center P and the gravity center P is 1 m, the controller 3 controls the two air cylinders 283 to provide balanced torques at the two sides of the gravity center P, such that the movable base body 23 moves upward as a whole, and a total supporting force of the air cylinders 283 at the two sides of the gravity center P to the movable base body 23 is greater than the weight of the movable base body 23. In other words, the supporting force of the air cylinder 283 at the left side of the gravity center P to the movable base body 23 can be 180 N, and the supporting force of the air cylinder 283 at the right side of the gravity center P to the movable base body 23 can be 360 N. Thus, the torques at the two sides of the gravity center P are equivalent and balanced to each other, and the total supporting force is greater than 500 N, until the detecting value of the clearance sensor 291 is the predetermined clearance value. Then, the total supporting force of the air cylinders 283 at the two sides of the gravity center P to the movable base body 23 is adjusted to be equal to the weight of the movable base body 23. In other words, the supporting force of the air cylinder 283 at the left side of the gravity center P to the movable base body 23 can be 167 N, and the supporting force of the air cylinder 283 at the right side of the gravity center P to the movable base body 23 can be 333 N, thus ensuring the height of the movable base body 23 to be unchanged. The controller 3 may control one or more of the air cylinders 283 located at the right side of the gravity center P to simultaneously adjust the movable base body 23. Similarly, the controller 3 may control one or more of the air cylinders 283 located at the left side of the gravity center P to simultaneously adjust the movable base body 23, such that the correction mechanisms 28 correspondingly adjust the movable base body 23.

In other embodiments, when only one correction driving mechanism is provided, the correction driving mechanism may be located right above or right below the gravity center P of the movable base body 23. In this case, the controller 3 controls the correction driving mechanism to adjust the movable base body 23 to move upward as a whole. A total supporting force of the correction driving mechanism to the movable base body 23 is in an opposite direction to the gravity center P and is greater than the weight of the movable base body 23, until the detecting value of the clearance sensor 291 is the predetermined clearance value. Then, the total supporting force of the correction driving mechanism to the movable base body 23 is adjusted to be equal to the weight of the movable base body 23, thus ensuring the height of the movable base body 23 to be unchanged.

Figure 10:
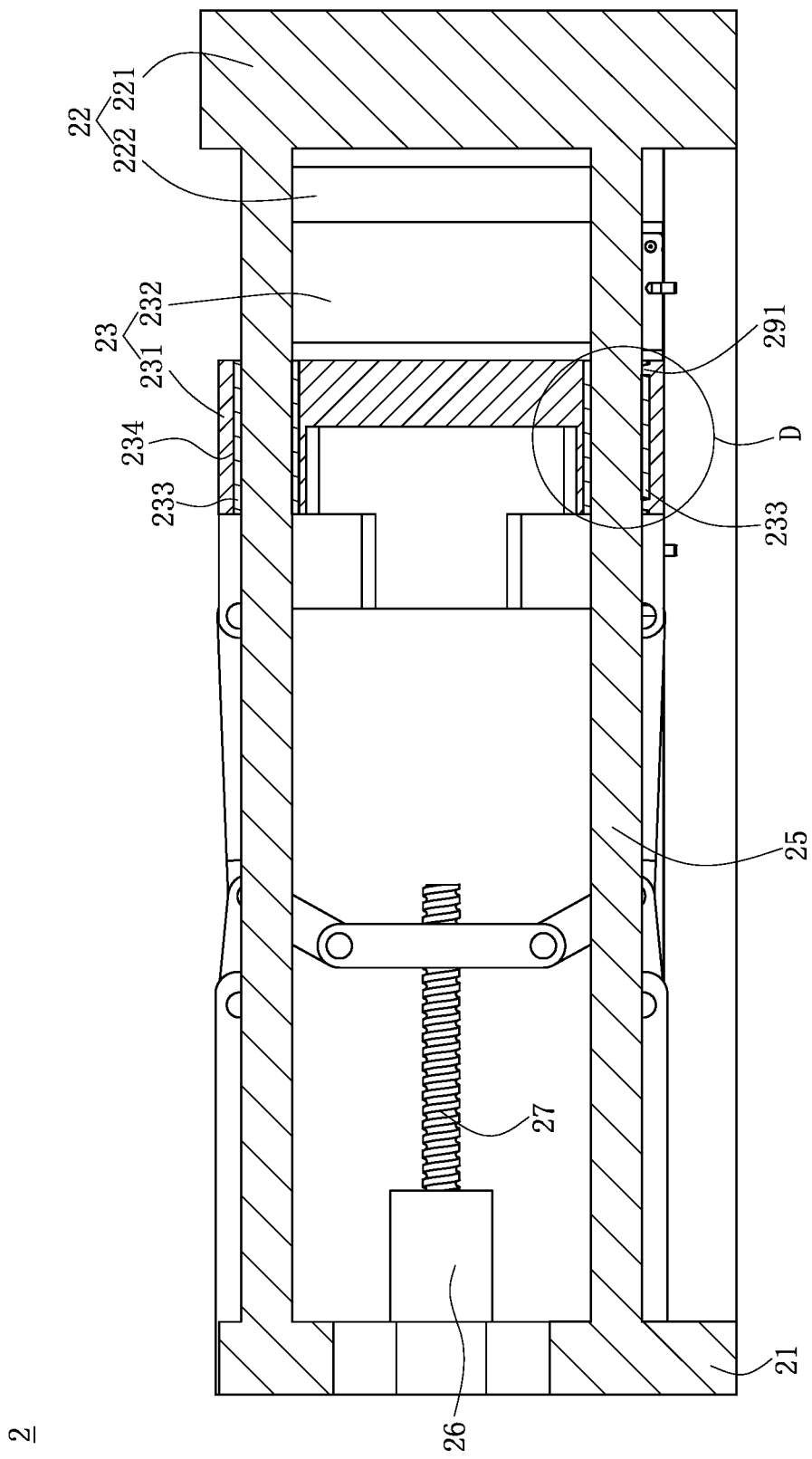
FIG. 10 is a sectional view of the device body when the clearance sensor is provided on the movable mold base according to other embodiments of the present invention.
Figure 11:
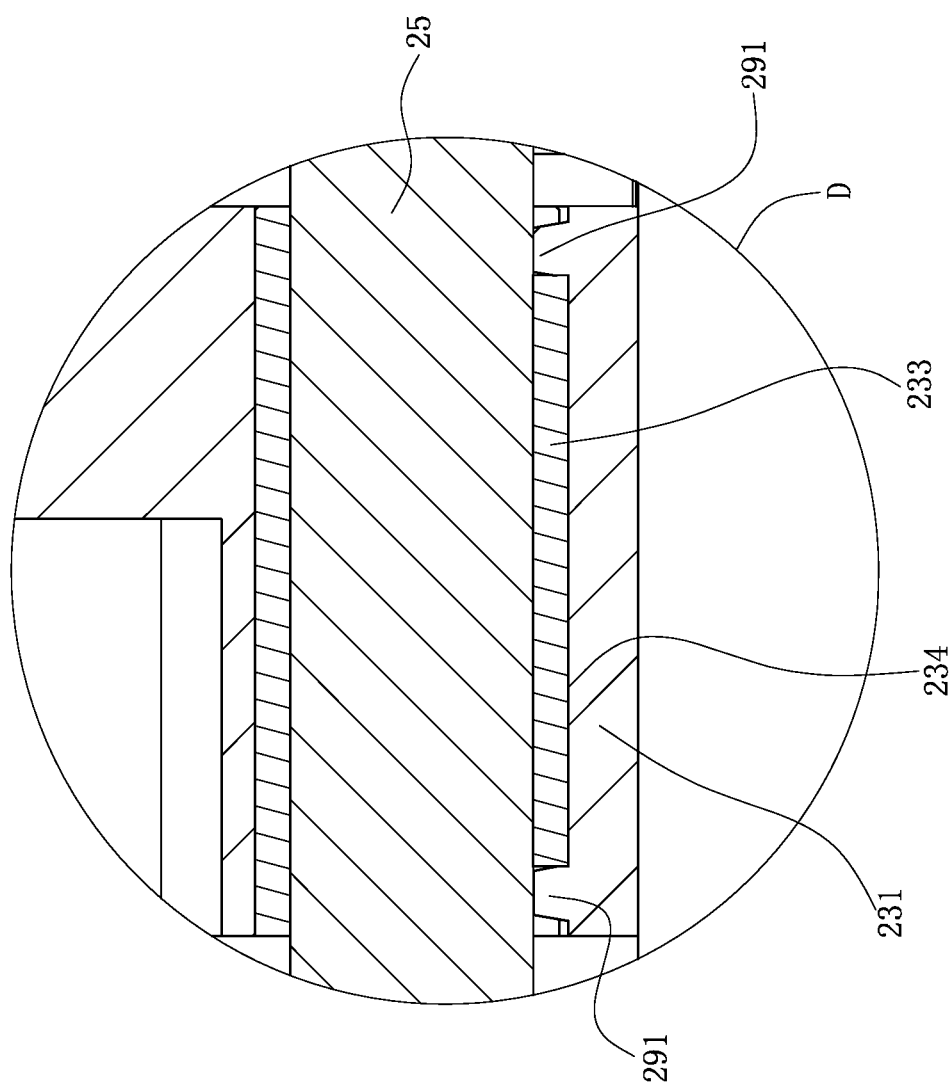
FIG. 11 is an enlarged view of FIG. 10.
Figure 12:
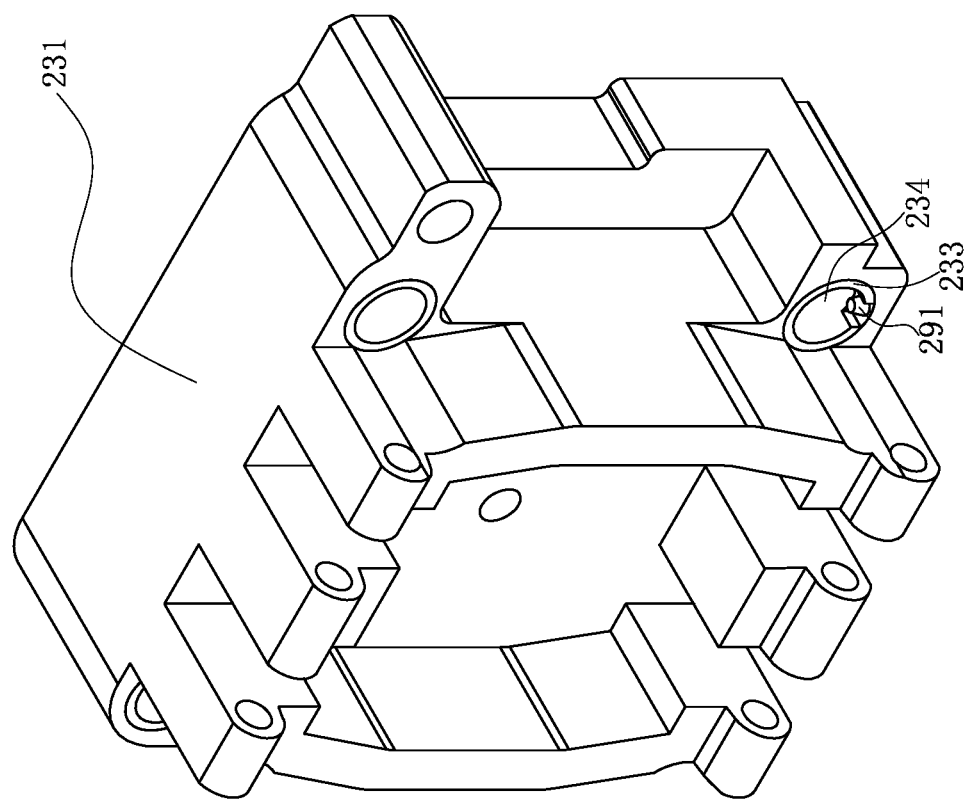
FIG. 12 is a structural schematic view of the clearance sensor being provided on the movable mold base according to other embodiments of the present invention.

In other embodiments, as shown in FIG. 10 to FIG. 12, the clearance sensors 291 may be fixed to the movable mold base 231 corresponding to the receiving holes 234. In other embodiments, the clearance sensors 291 may also be provided on the guide sleeves. Two clearance sensors 291 are provided and located at two ends of the receiving holes 234 in its axial direction, and the two clearance sensors 291 pass through the guide sleeves 233 to be in contact with the lower end of the guide rods 25. The guide sleeves 233 have corresponding reserved space for the clearance sensors 291 to mount thereon. In this case, the clearance sensors 291 may directly detect the clearance between the inner walls of the receiving holes 234 and the guide rods 25, and the detection can be conducted without waiting until the guide rods 25 deform, such that the controller 3 may adjust the movement of the movable base body 23 in the vertical direction real-time, preventing the guide rods 25 from deformation under forces and wear.

As shown in FIG. 13 to FIG. 20, in other embodiments, the sensor 29 may be a force sensor 292 or a torsion sensor 293 or a stress sensor 294, or other types of sensors 29 which are not hereinafter limited thereto, for detecting the contact force between the guide rods 25 and the inner walls of the corresponding receiving holes 234, and thus obtaining the corresponding detecting values.

Figure 13:
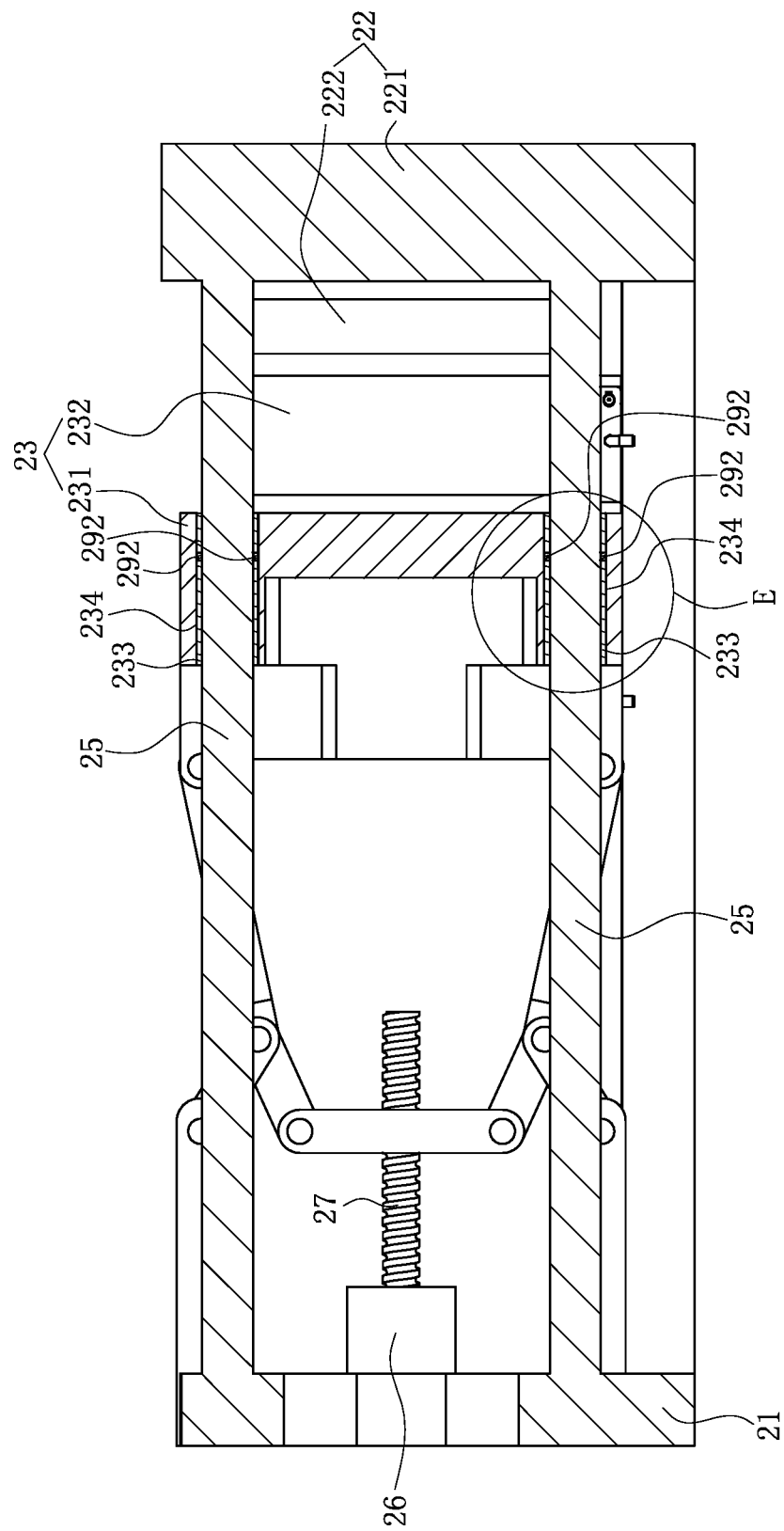
FIG. 13 is a sectional view of the device body when the sensor is a force sensor according to other embodiments of the present invention.
Figure 14:
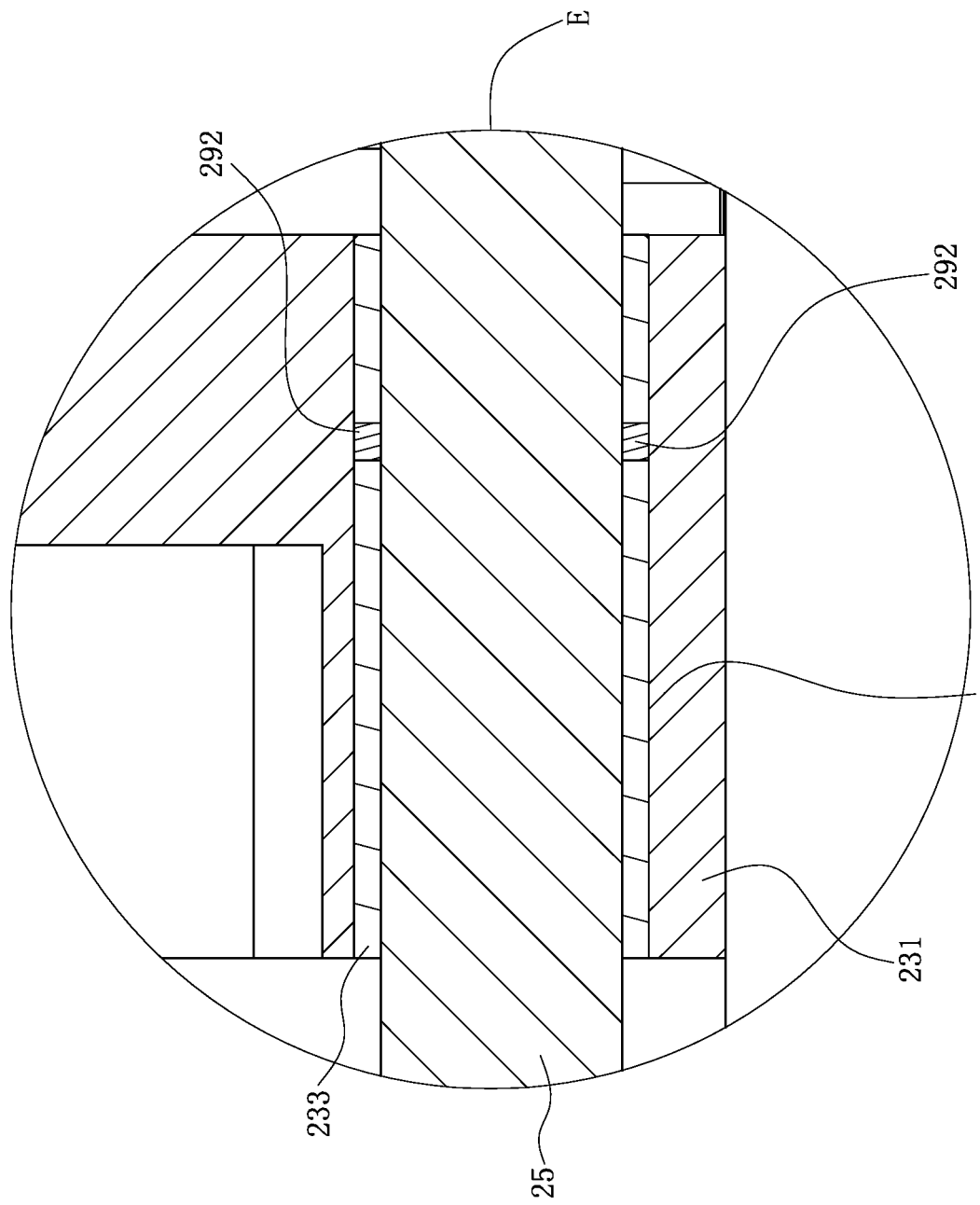
FIG. 14 is an enlarged view of FIG. 13.
Figure 15:
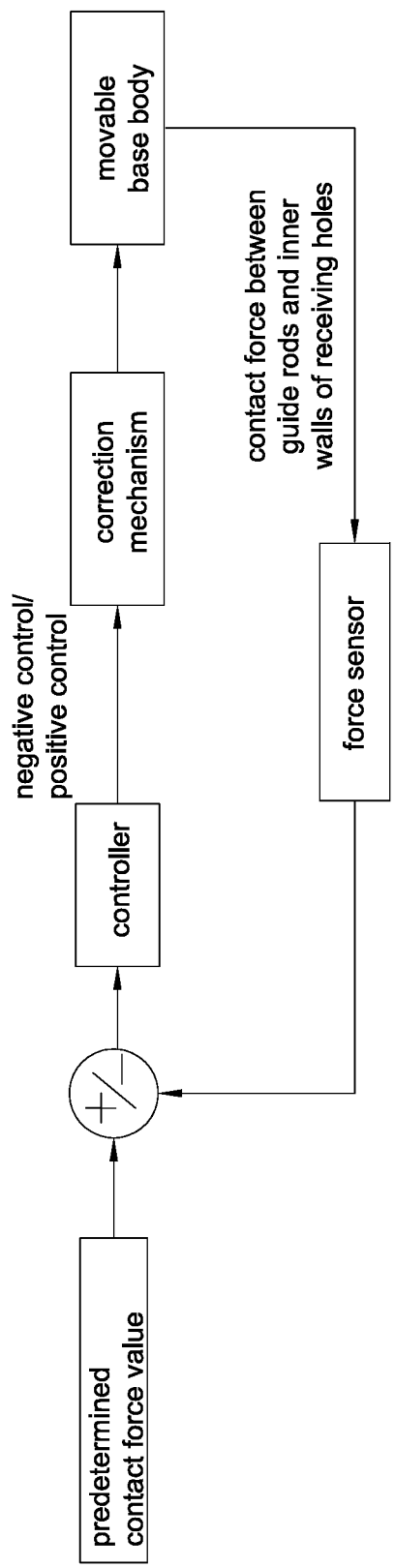
FIG. 15 is a control flowchart when the sensor is a force sensor according to other embodiments of the present invention.

As shown in FIG. 13 to FIG. 15, when the sensor 29 is a force sensor 292, the force sensor 292 is provided on the guide sleeves 233. In other embodiments, the force sensor 292 may also be provided on the guide rods 25. The force sensor 292 detects the contact force value of the guide rods 25 to the inner walls of the receiving holes 234, which is equal to or greater than zero. The force sensor 292 is provided on the guide sleeves 233, and each guide sleeve 233 has a smaller size relative to the movable mold base 231. Correspondingly, it is easier and more convenient to machine the guide sleeves 233 and to mount the force sensor 292, which facilitates the mounting of the force sensor 292 and the convenience for the detachment and replacement of the force sensor 292. Further, the force sensor 292 moves together with the sliding of the movable base body 23, such that the guide rods 25 are more protected in the sliding stroke, further enhancing the usage life of the guide rods 25 and the movable base body 23.

As shown in FIG. 15, a predetermined contact force value exists between the guide rods 25 and the inner walls of the corresponding receiving holes 234. The predetermined contact force value is a base value configured in the controller 3 for the case when the movable base body 23 does not generate an acting force to the guide rods 25. The predetermined contact force value can be a single value or a range value, which is based on the movable base body 23 not generating an acting force to the guide rods 25. The movable base body 23 sinks or tilts due to the gravity, such that the guide rods 25 are in contact with the inner walls of the corresponding receiving holes 234 and generates a variable contact force. Thus, the controller 3 determines whether the corresponding detecting values of the force sensor 292 match with the predetermined contact force value to correspondingly control the correction mechanisms 28. For example, the predetermined contact force value is set to be zero. When the force sensor 292 detects the contact force value between the guide rods 25 and the inner walls of the corresponding receiving holes 234 to be greater than zero, the controller 3 determines that the movable base body 23 is sinking. Thus, the controller 3 correspondingly controls the correction driving mechanism to drive the upper supporting member 281, thus adjusting the movable base body 23 to move upward as a whole until the detecting value of the force sensor 292 is zero, thus significantly reducing the acting force by the movable base body 23 to the guide rods 25, preventing from the wear of the movable base body 23 and the guide rods 25, and enhancing the usage life of the guide rods 25 and the movable base body 23.

Figure 16:
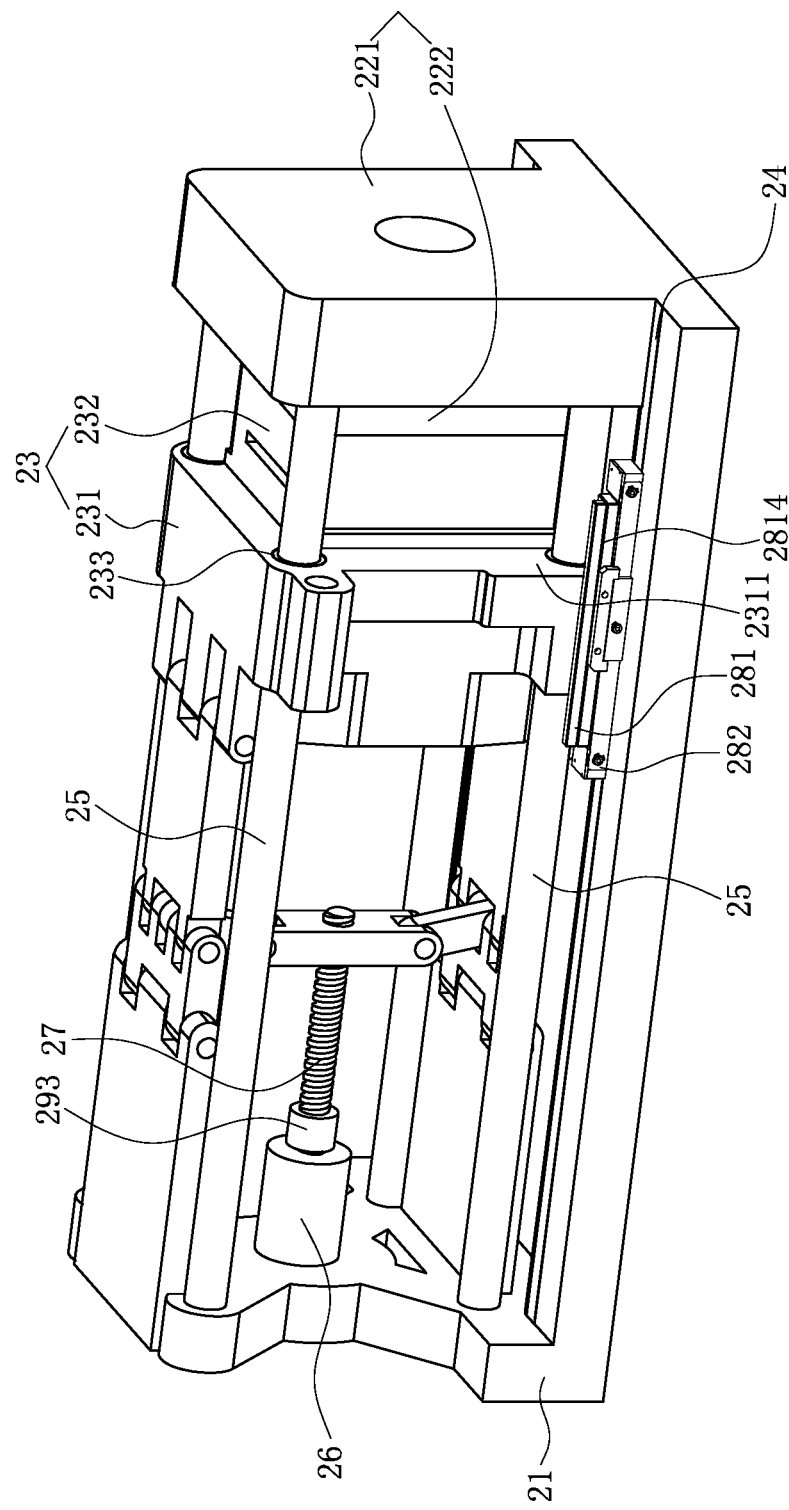
FIG. 16 is a perspective view of the device body when the sensor is a torsion sensor according to other embodiments of the present invention.
Figure 17:
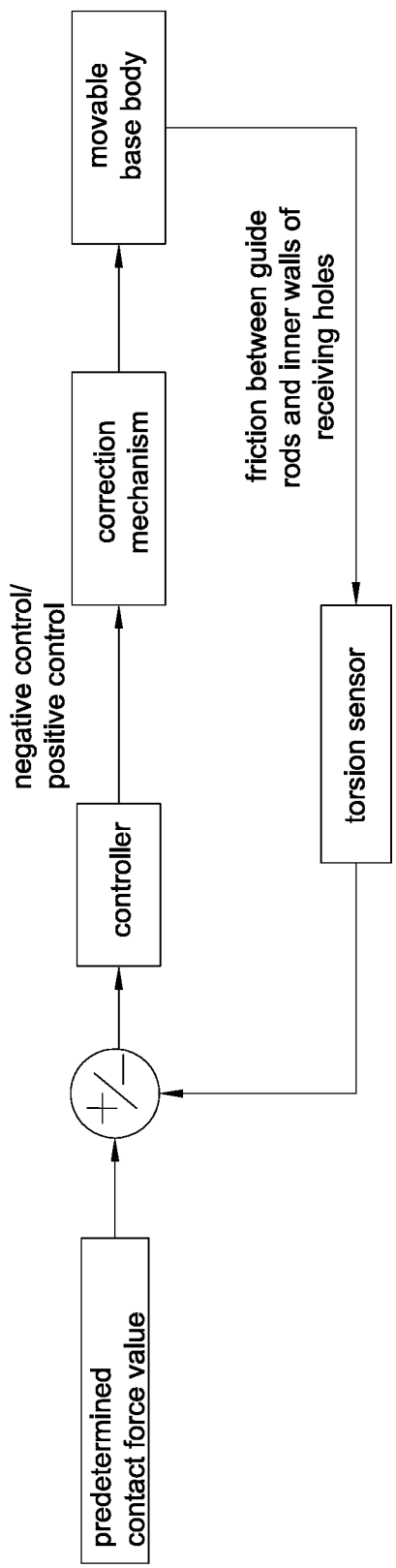
FIG. 17 is a control flowchart when the sensor is a torsion sensor according to other embodiments of the present invention.

As shown in FIG. 16 to FIG. 17, when the sensor 29 is a torsion sensor 293, the torsion sensor 293 is provided on the motor 26. In other embodiments, the torsion sensor 293 may also be provided on the screw bolt 27. After the guide rods 25 receive the acting force of the movable base body 23, a contact force exists between the guide rods 25 and the inner walls of the corresponding receiving holes 234, which correspondingly generate a friction. Correspondingly, the torsion of the motor 26 increases, such that the screw bolt 27 has a greater driving force to drive the movable base body 23 to move reciprocally. Thus, by checking the torsion of the motor 26, it is possible to detect the change of the driving force of the screw bolt 27 to the movable base body 23, thereby detecting the contact force between the guide rods 25 and the inner walls of the corresponding receiving holes 234. The predetermined contact force value exists between the guide rods 25 and the inner walls of the corresponding receiving holes 234. The predetermined contact force value is a base value configured in the controller 3 for the case when the movable base body 23 does not generate an acting force to the guide rods 25. The predetermined contact force value can be a single value or a range value, which is based on the movable base body 23 not generating an acting force to the guide rods 25. The movable base body 23 sinks or tilts due to the gravity, such that the guide rods 25 are in contact with the inner walls of the corresponding receiving holes 234 and generates a variable contact force, which makes the friction thereof to change. Thus, the controller 3 determines whether the corresponding detecting values of the torsion sensor 293 match with the predetermined contact force value to correspondingly control the correction mechanisms 28. For example, the predetermined contact force value is set to be zero. When the torsion sensor 293 detects the contact force value between the guide rods 25 and the inner walls of the corresponding receiving holes 234 to be greater than zero, it is determined that the friction exists between the guide rods 25 and the inner walls of the corresponding receiving holes 234, such that the screw bolt 27 requires a greater driving force to drive the movable base body 23 to move. Thus, the controller 3 correspondingly controls the correction driving mechanism to drive the upper supporting member 281, thus adjusting the movable base body 23 to move upward as a whole until the detecting value of the torsion sensor 293 is zero.

Figure 18:
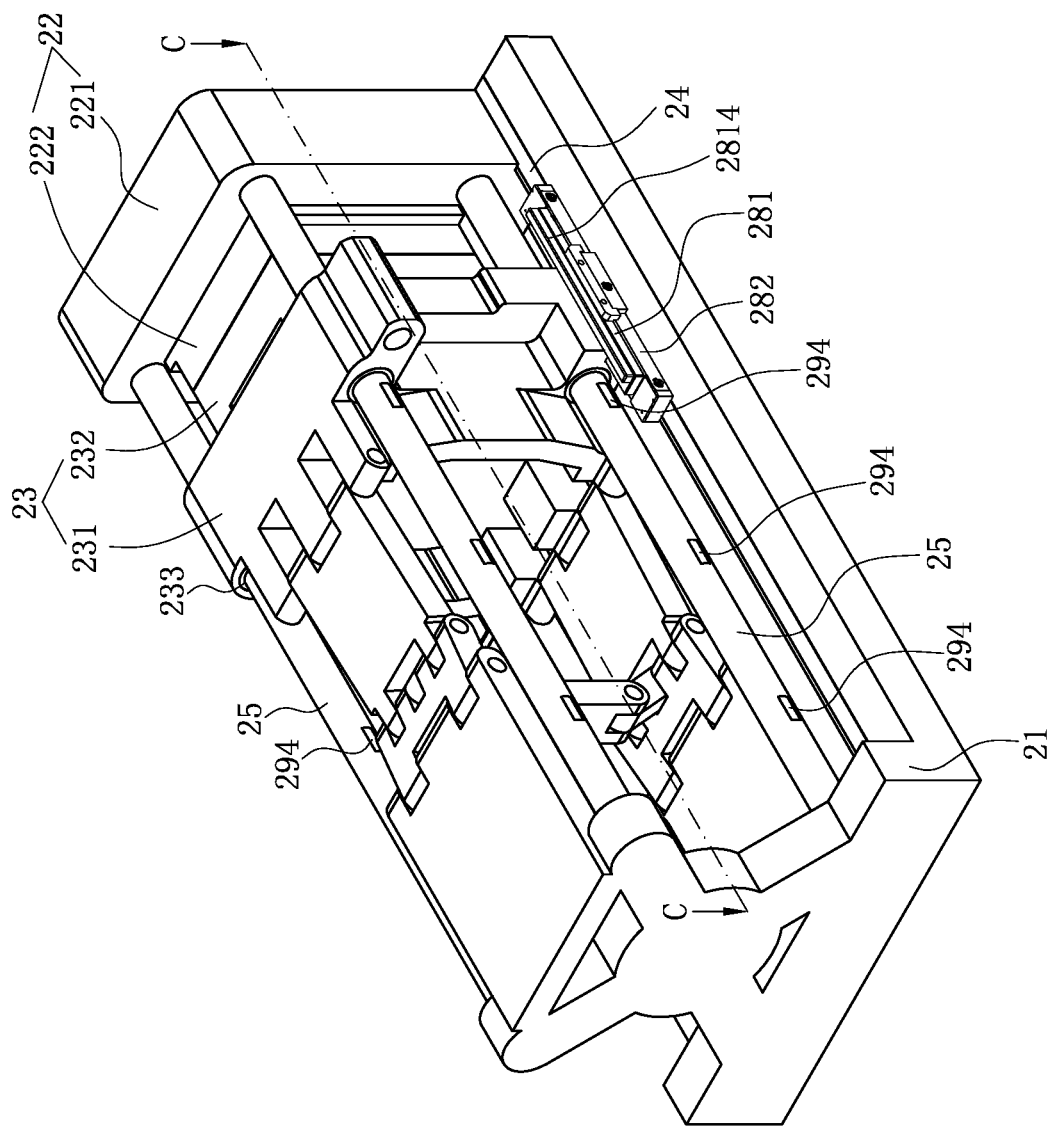
FIG. 18 is a perspective view of the device body when the sensor is a strain sensor according to other embodiments of the present invention.
Figure 19:
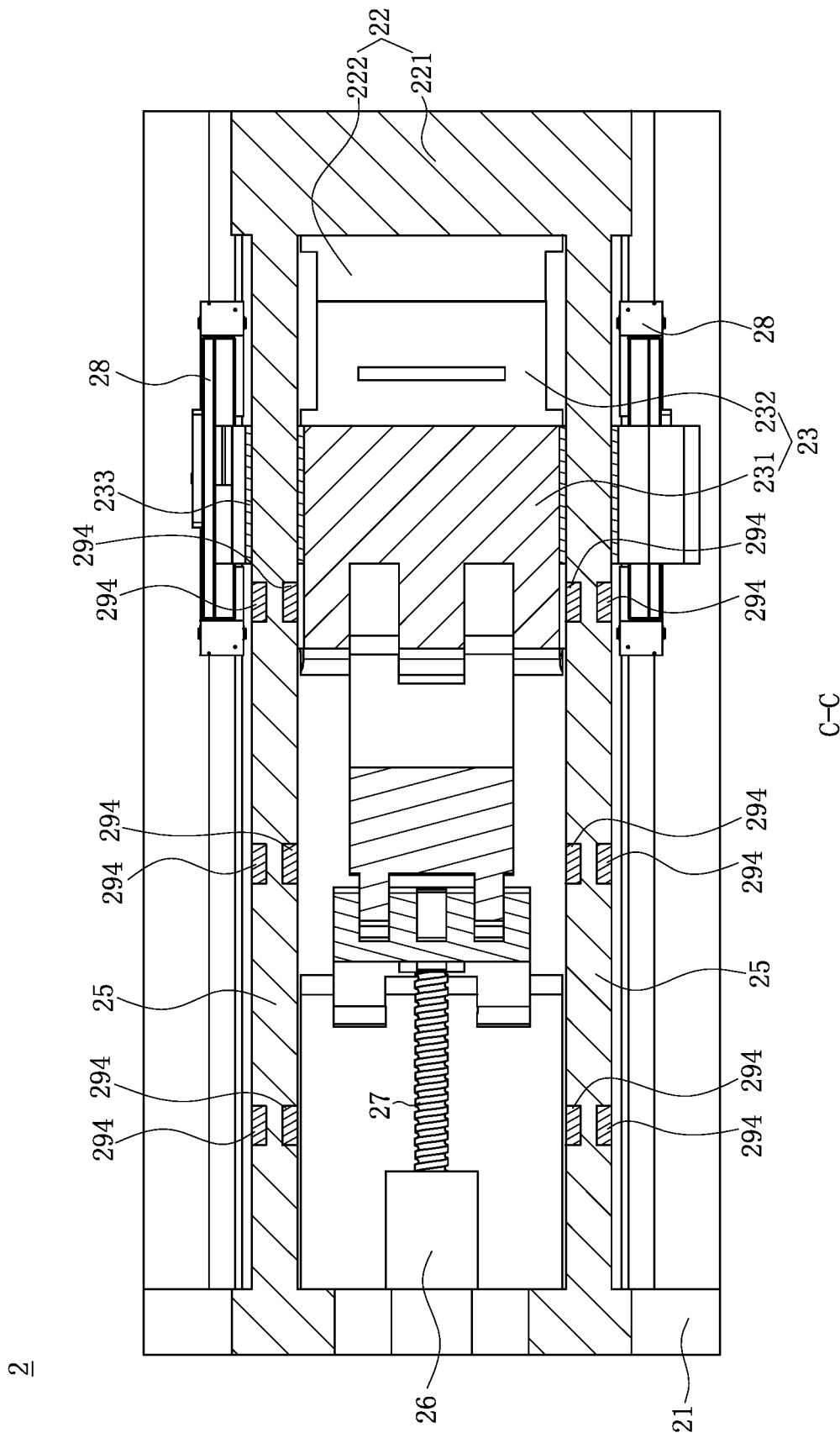
FIG. 19 is a sectional view of FIG. 18 along the C-C direction.
Figure 20:
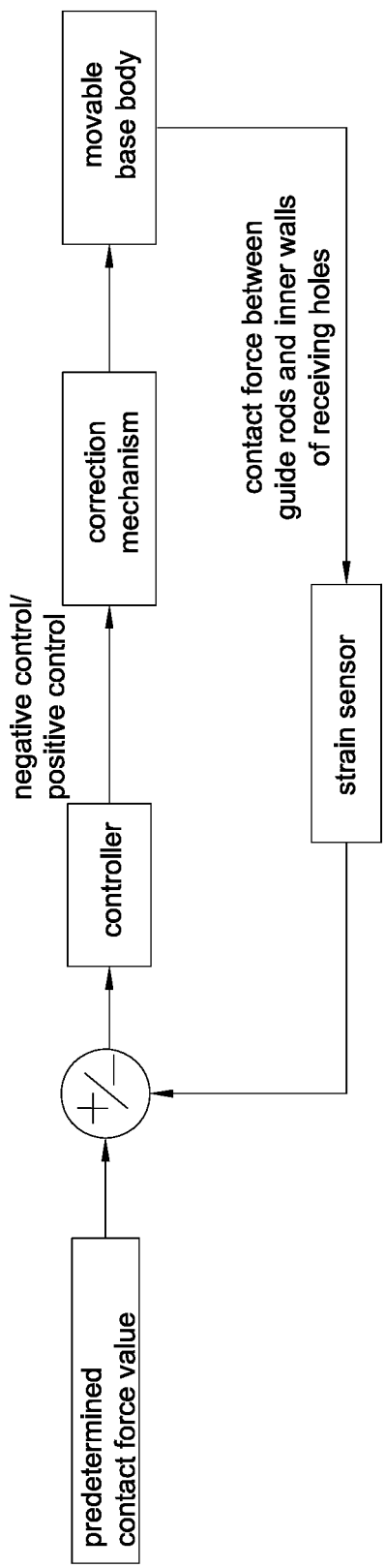
FIG. 20 is a control flowchart when the sensor is a strain sensor according to other embodiments of the present invention.

As shown in FIG. 18 to FIG. 20, when the sensor 29 is a strain sensor 294, each of the guide rods 25 is provided with six strain sensors 294 exposed at an outer surface of each guide rod 25 to facilitate the mounting of the strain sensors 294. In other embodiments, each of the guide rods 25 may be provided with one or more strain sensors 294. Each of the two opposite ends of each guide rod 25 along its axial cross-section is provided with three strain sensors 294 at intervals. In other embodiments, the strain sensors 294 may be located at a lower end of each guide rod 25, as the lower end of each guide rod 25 is the position where the deformation amount of each guide rod 25 is greater, to significantly detect the deformation amount of each guide rod 25. The three strain sensors 294 are aligned in a straight line along an axial direction of each guide rod 25. After the guide rods 25 receives the acting force of the movable base body 23, the guide rods 25 generate deformation. By detecting the deformation amounts of the guide rods 25 at different portions, the force application at different portions of each guide rod 25 can be detected, and the contact force between the guide rods 25 and the inner walls of the corresponding receiving holes 234 can be correspondingly detected. Further, the detection error can be reduced by determining altogether the force application of the guide rods 25 with the detecting values at different portions thereof. Moreover, the strain sensors 294 are aligned in a straight line along the axial direction of each guide rod 25, which eliminates the errors of the strain sensors 294 in different heights at different positions of each guide rod 25, thus reducing the detection error, such that the detection result becomes more accurate, and the controller 3 may determine whether the adjustments by the correction mechanisms 28 are in place more accurately. A predetermined contact force value exists between the guide rods 25 and the inner walls of the corresponding receiving holes 234. The predetermined contact force value is a base value configured in the controller 3 for the case when the movable base body 23 does not generate an acting force to the guide rods 25. The predetermined contact force value can be a single value or a range value, which is based on the movable base body 23 not generating an acting force to the guide rods 25. Each of the strain sensor 294 corresponds to a predetermined contact force value. The predetermined contact force value is set to be zero. When the strain sensors 294 detect the deformation amount of each guide rod 25 to be greater than zero, the controller 3 determines that the movable base body 23 is sinking, such that a contact force is generated between the guide rods 25 and the inner walls of the corresponding receiving holes 234 to make the guide rods 25 deform. Thus, the controller 3 correspondingly controls the correction driving mechanisms to drive the upper supporting member 281, thus adjusting the movable base body 23 to move upward as a whole until the corresponding detecting values of the strain sensors 294 is zero.

In other embodiments, the sinking or tilting of the movable base body 23 increases the pressure to the correction mechanisms 28, causing the clearance and the contact force between the movable base body and the correction mechanisms 28 to change. Thus, the sensor 29 may correspondingly detect the clearance and the contact force between the movable base body 23 and the correction mechanisms 28, and thereby obtaining corresponding detecting values. The predetermined clearance value and the predetermined contact force value are base values between the movable base body 23 and the correction mechanisms 28 for the case when the movable base body 23 does not generate an acting force to the guide rods 25. In this case, the sensor 29 may be provided at the bottom end of the movable base body 23 or the top end of the correction mechanisms 28, such that the sensor 29 may detect the clearance and contact force between the movable base body 23 and the correction mechanisms 28. In addition, the sinking or tilting of the movable base body 23 increases the pressure to the correction mechanisms 28, thereby increasing the pressure to the guide rails 24, causing the clearance and the contact force between the correction mechanisms 28 and the guide rails 24 to change. Thus, the sensor 29 may correspondingly detect the clearance and the contact force between the correction mechanisms 28 and the guide rails 24, and thereby obtaining corresponding detecting values. The predetermined clearance value and the predetermined contact force value are base values between the correction mechanisms 28 and the guide rails 24 for the case when the movable base body 23 does not generate an acting force to the guide rods 25. In this case, the sensor 29 may be provided at the bottom end of the correction mechanisms 28 or the top end of the guide rails 24, such that the sensor 29 may detect the clearance and contact force between the correction mechanisms 28 and the guide rails 24.

In other embodiments, multiple sensors 29 with different detecting functions may be provided altogether to detect whether the movable base body 23 generates an acting force to the guide rods 25, such that the controller 3 may perform determinations according to the detecting values of the sensors 29 and correspondingly control the correction mechanisms 28, reducing the detection error by multiple determinations, such that the detecting result becomes more accurate, and the controller 3 may determine whether the adjustments by the correction mechanisms 28 are in place more accurately, such that the moving position of the movable base body 23 is more accurate. For example, a sensor 29 for detecting the clearance value and a sensor 29 for detecting the contact force value can be provided simultaneously. Specifically, a clearance sensor 291 and a force sensor 292 can be provided simultaneously. The clearance sensor 291 is used to detect the clearance between the guide rods 25 and the inner walls of the corresponding receiving holes 234 to obtain the corresponding detecting values, and the force sensor 292 is used to detect the contact force between the guide rods 25 and the inner walls of the corresponding receiving holes 234 to obtain the corresponding detecting values. Further, in other embodiments, a sensor 29 may be provided to not only detect the clearance value but also detect the contact force value. In other words, the sensor 29 is integrated by a sensor 29 for detecting the clearance value and a sensor 29 for detecting the contact force value. For example, the sensor may be an integration of the clearance sensor 291 and the force sensor 292.

Figure 21:
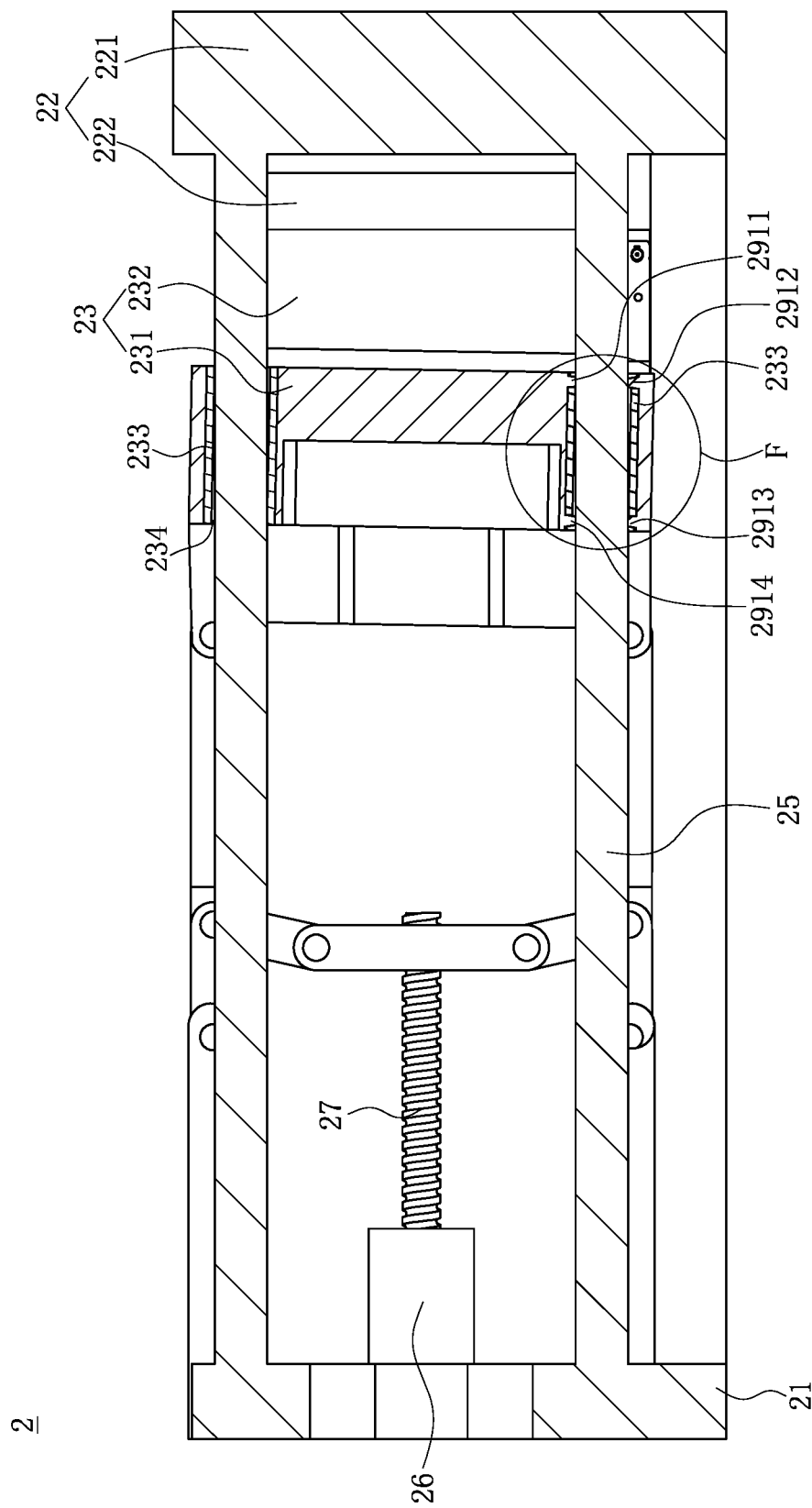
FIG. 21 is a sectional view of the device body when the sensor detects whether the movable mold base is tilting according to other embodiments of the present invention.
Figure 22:
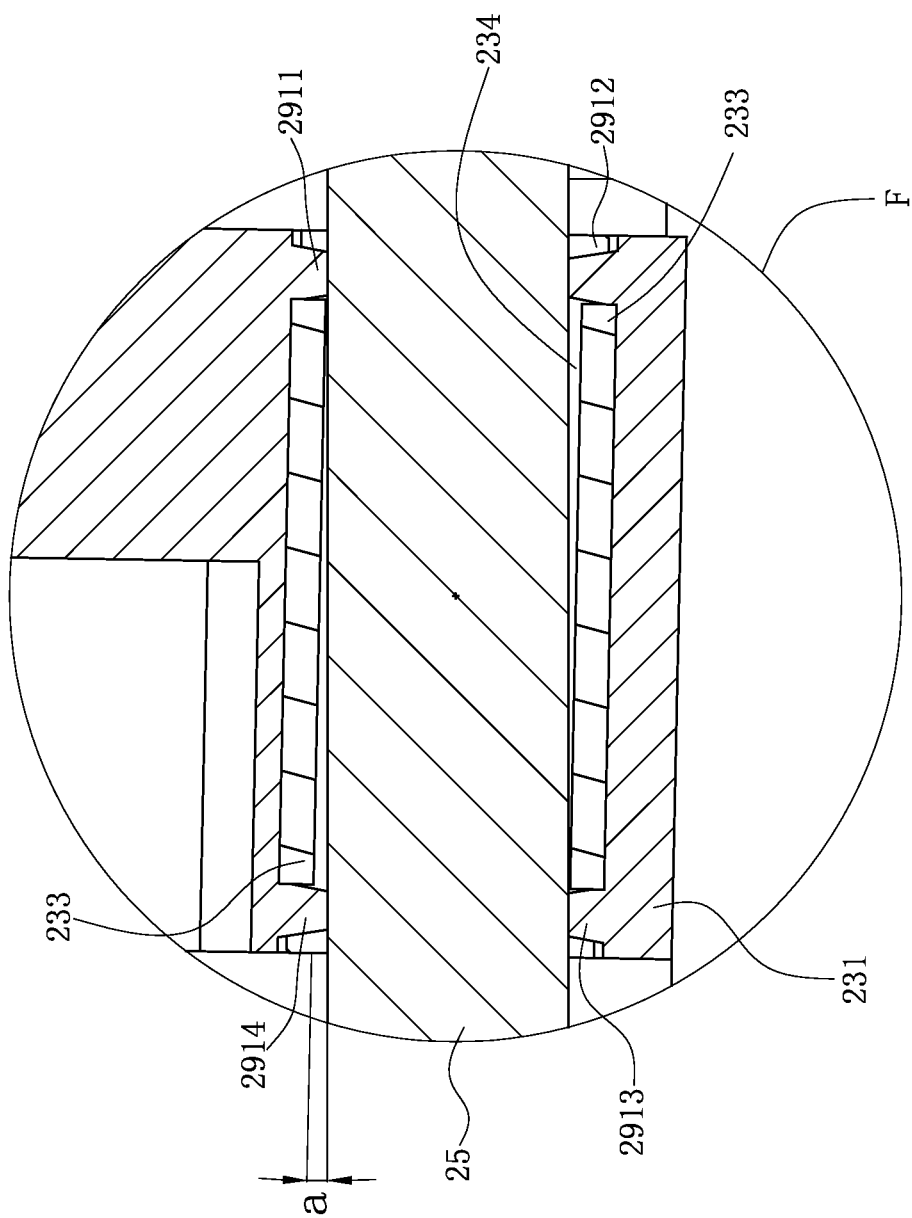
FIG. 22 is an enlarged view of FIG. 21.

Further, the fixed end is applied with a binding force and is more stable relative to the free end. Thus, the free end sinks more easily relative to the fixed end, thereby causing the movable base body 23 to tilt easily. In addition, the free end of the movable base body 23 has the first mold, such that the sinking height of the free end is greater and more significantly relative to the fixed end, and the tilting angle a of the movable base body 23 is greater. When the movable base body 23 tilts, all components of the movable base body 23 except for the gravity center P rotate about the gravity center P, and move along the sliding direction of the movable base body 23. As shown in FIG. 21 to FIG. 22, in other embodiments, at least two sensors 29 are provided at intervals to form a connecting line, such that the controller 3 may determine whether the movable base body 23 tilts by the detecting values of the two sensors 29, and correspondingly control the correction mechanisms 28 to drive the movement of the movable base body 23 in the vertical direction and to adjust the tilting angle a of the movable base body 23, such that the tilting angle a of the movable base body 23 is reduced, thus reducing the acting force to the guide rods 25 due to the tilting of the movable base body 23, preventing the movable base body 23 and the guide rods 25 from wear, and enhancing the usage life of the guide rods 25 and the movable base body 23. Thus, the two sensors 29 are provided at positions where deviation occurs when the movable base body 23 tilts. That is, the two sensors 29 are provided along the sliding direction or the vertical movement direction of the movable base body 23. Further, one of the sensors 29 is close to the fixed base body 22 relative to the other sensor 29, such that the positions of the two sensors 29 change significantly, facilitating the detecting values of the sensors 29 to be more accurate and changing more significantly, allowing the controller 3 to determine the tilting degree of the movable base body 23 more accurately, and to control the correction mechanisms 28 to adjust the movement height of the movable base body 23 in the vertical direction. The two sensors 29 can be the same, or can be different, as long as they may be used to determine whether the movable base body 23 tilts. For example, the two sensors 29 can be both clearance sensors 291, or can be both force sensors 292, or can be both height sensors. Alternatively, one of the sensors 29 can be the clearance sensor 291, and the other sensor 29 is the force sensor 292, etc. Further examples are not hereinafter elaborated.

As shown in FIG. 21 to FIG. 22, four sensors 29 are provided, and are all clearance sensors 291 for detecting the clearance values between the guide rods 25 and the inner walls of the receiving holes 234. The four clearance sensors 291 are fixed to the movable mold base 231 corresponding to the receiving holes 234. The four clearance sensors 291 include a first clearance sensor 2911, a second clearance sensor 2912, a third clearance sensor 2913, and a fourth clearance sensor 2914. The first clearance sensor 2911 and the fourth clearance sensor 2914 are provided at intervals along an axial direction of the inner wall of the receiving hole 234, and are located at a top end of the inner wall of the receiving hole 234. The second clearance sensor 2912 and the third clearance sensor 2913 are provided at intervals along an axial direction of the inner wall of the receiving hole 234, and are located at a bottom end of the inner wall of the receiving hole 234. Specifically, the first clearance sensor 2911 and the second clearance sensor 2912 are located at a right end along the axial direction of the inner wall of the receiving hole 234, and the third clearance sensor 2913 and the fourth clearance sensor 2914 are located at a left end along the axial direction of the inner wall of the receiving hole 234. Multiple predetermined clearance values exists between the guide rods 25 and the inner walls of the receiving holes 234, and each of the clearance sensors 291 corresponds to one of the predetermined clearance values. The controller 3 determines whether the corresponding detecting values of the four clearance sensors 291 match with the predetermined clearance values to correspondingly control the correction mechanisms 28. For example, the four predetermined clearance values are all set to be 0.05. When the movable base body 23 only sinks, the detecting values of the first clearance sensor 2911 and the fourth clearance sensor 2914 are changed to be less than 0.05, and the detecting values of the second clearance sensor 2912 and the third clearance sensor 2913 are changed to be greater than 0.05. In this case, the controller 3 correspondingly controls the correction driving mechanism to adjust the movable base body 23, such that the detecting values of the four clearance sensors 291 correspondingly match with the predetermined clearance values. When the movable base body 23 only tilts, the detecting values of the first clearance sensor 2911 and the third clearance sensor 2913 are changed to be less than 0.05, and the detecting values of the second clearance sensor 2912 and the fourth clearance sensor 2914 are changed to be greater than 0.05. In this case, the controller 3 correspondingly controls the correction driving mechanism to adjust the movable base body 23, such that the detecting values of the four clearance sensors 291 correspondingly match with the predetermined clearance values. When the movable base body 23 sinks and tilts simultaneously, the detecting value of the first clearance sensor 2911 is less than the detecting value of the fourth clearance sensor 2914, and both are less than 0.05; and the detecting value of the second clearance sensor 2912 is greater than the detecting value of the third clearance sensor 2913, and both are greater than 0.05. In this case, the controller 3 correspondingly controls the correction driving mechanism to adjust the movable base body 23, such that the detecting values of the four clearance sensors 291 correspondingly match with the predetermined clearance values.

As shown in FIG. 24, to adjust the tilting angle a of the movable base body 23, at least two supporting positions Q are provided, and are respectively located at the two sides of the gravity center P, and two correction driving mechanisms are provided corresponding to the two supporting positions Q. The controller 3 controls the two correction driving mechanisms to individually apply supporting forces upward to the supporting positions Q to correspondingly adjust the tilting angle a of the movable base body 23, such that the detecting values of the sensor 29 finally match with the corresponding predetermined values.

As shown in FIG. 24, it is configured that the weight of the movable mold base 231 is 200 N, the weight of the first mold 232 is 300 N, and the location of the gravity center P is configured to be outside the movable mold base 231. A distance L1 between the supporting position Q located at the left side of the gravity center P and the gravity center P is 2 m, and a distance L2 between the supporting position Q located at the right side of the gravity center P and the gravity center P is 1 m. When the movable base body 23 only tilts, the supporting forces of the correction driving mechanisms to the movable base body 23 are in an opposite direction to the gravity direction of the movable base body 23, and a total supporting force of the two correction driving mechanisms to the movable base body 23 is equal to the weight of the movable base body 23. Further, the torque at the right side of the gravity center P is greater than the torque at the left side of the gravity center. In other words, the supporting force of the air cylinder 283 at the left side of the gravity center P to the movable base body 23 can be 125 N, and the supporting force of the air cylinder 283 at the right side of the gravity center P to the movable base body 23 can be 375 N, such that the free end of the movable base body 23 rotates counterclockwise relative to the fixed end thereof, thus reducing the tilting angle a of the movable base body 23, such that the detecting value of the sensor 29 reaches the corresponding predetermined value, thereby allowing the movable base body 23 not to tilt or reducing the tilting angle, such that the acting force of the movable base body 23 to the guide rods 25 is reduced. When the detecting value of the sensor 29 reaches the corresponding predetermined value, the controller 3 controls the torque at the right side of the gravity center P to be equivalent and balanced to the torque at the left side of the gravity center P. That is, the supporting force of the air cylinder 283 at the left side of the gravity center P to the movable base body 23 can be 167 N, and the supporting force of the air cylinder 283 at the right side of the gravity center P to the movable base body 23 can be 333 N. When the movable base body 23 sinks and tilts simultaneously, the total supporting force of the two correction driving mechanisms to the movable base body 23 is greater than the weight of the movable base body 23, such that the movable base body 23 moves upward as a whole. In other words, the supporting force of the air cylinder 283 at the left side of the gravity center P to the movable base body 23 can be 135 N, and the supporting force of the air cylinder 283 at the right side of the gravity center P to the movable base body 23 can be 405 N, such that the free end of the movable base body 23 rotates counterclockwise relative to the fixed end thereof, thus reducing the tilting angle a of the movable base body 23, thereby allowing the movable base body 23 not to tilt or reducing the tilting angle, such that the supporting force of the movable base body 23 to the guide rods 25 is reduced, until the detecting value of the sensor 29 reaches the predetermined value. In this case, the controller 3 controls the torque at the right side of the gravity center P to be equivalent and to the torque at the left side of the gravity center P, and the total supporting force of the two correction driving mechanisms to the movable base body 23 is equal to the weight of the movable base body 23. That is, the supporting force of the air cylinder 283 at the left side of the gravity center P to the movable base body 23 can be 167 N, and the supporting force of the air cylinder 283 at the right side of the gravity center P to the movable base body 23 can be 333 N, thus preventing the movable base body 23 from sinking and tilting. In the process of adjusting the tilting angle a of the movable base body 23, the two correction driving mechanisms respectively drive the movable base body 23 at the two sides of the gravity center P to move at different heights, such that the detecting values of the sensor 29 finally match with the corresponding predetermined values, and thereby allowing the movable base body 23 to receive a balanced force as a whole.

In other embodiments, two or more upper supporting members 281 are provided. In this case, the two upper supporting member 281 are respectively located at the two sides of the gravity center P along the sliding direction of the movable base body 23, and each of the upper supporting members 281 is correspondingly connected to at least one of the correction driving mechanisms. The two correction driving mechanisms respectively correspond and drive the upper supporting members 281 to adjust the tilting angle a of the movable base body 23, such that the movable base body 23 receive forces at the two sides of the gravity center P, and the acting force applied to the guide rods 25 are reduced, thus reducing the wear of the movable base body 23 and the guide rods 25. Further, the two upper supporting member 281 have different supporting forces, allowing the movable base body 23 to be adjusted by different movement heights along the tilting direction, such that the detecting values of the two sensors 29 respectively reach the predetermined tilting angle values, thereby allowing the movable base body 23 to be more balanced. In addition, the two upper supporting member 281 are respectively connected to different correction driving mechanisms, facilitating integration of the driving force of each correction driving mechanism to the corresponding upper supporting member 281 and acting on the corresponding position of the movable base body 23, thereby reducing the loss of energy.

In other embodiments, the correction driving mechanisms are movable relative to the movable base body 23 along the sliding direction of the movable base body 23, and may move to different supporting positions Q. The controller 3 controls the correction driving mechanisms to correspondingly adjust the movable base body 23. In this case, fewer correction driving mechanisms may be provided, or only one correction driving mechanism is provided, to adapt to the position change of the gravity center P of the movable base body 23, and correspondingly adjust the movable base body 23, without providing multiple correction driving mechanisms, thus ensuring the correction driving mechanism adapts to the position change of the gravity center P of the movable base body 23, reducing the quantity of the correction driving mechanism, and saving the cost of the correction driving mechanism. The controller 3 may control one or more of the correction driving mechanisms to move relative to the movable base body 23, and to correspondingly adjust the movable base body 23.

When the controller 3 only controls one correction driving mechanism to adjust the movable base body 23, as shown in FIG. 24, the controller 3 controls the correction driving mechanism to move right below or right above the gravity center P. The direction of the supporting force of the correction driving mechanism to the movable base body 23 is opposite to the gravity direction of the movable base body 23, and the supporting force of the correction driving mechanism to the movable base body 23 is greater than the weight of the movable base body 23, such that the movable base body 23 moves upward as a whole. When the controller 3 determines that the detecting values of the sensor 29 match with the corresponding predetermined values, the supporting force of the correction driving mechanism to the movable base body 23 is equal to the weight of the movable base body 23, thus ensuring that the height of the movable base body 23 does not change. When the movable base body 23 tilts, the correction driving mechanism moves to the right side of the gravity center P, such that the movable base body 23 rotates counterclockwise to reduce the tilting angle a of the movable base body 23, until the detecting values of the sensor 29 match with the corresponding predetermined values, such that the controller 3 determines that the movable base body 23 is not tilting. In this case, the correction driving mechanism moves right below or right above the gravity center P, the direction of the supporting force of the correction driving mechanism to the movable base body 23 is opposite to the gravity direction of the movable base body 23, and the supporting force of the correction driving mechanism to the movable base body 23 is equal to the weight of the movable base body 23, thus ensuring that the height of the movable base body 23 does not change. When the movable base body 23 sinks and tilts simultaneously, the correction driving mechanism moves to the right side of the gravity center P, such that the movable base body 23 rotates counterclockwise to reduce the tilting angle a of the movable base body 23, until the detecting values of the sensor 29 match with the corresponding predetermined values, such that the controller 3 determines that the movable base body 23 is not tilting. In this case, the correction driving mechanism moves right below or right above the gravity center P, the direction of the supporting force of the correction driving mechanism to the movable base body 23 is opposite to the gravity direction of the movable base body 23, the supporting force of the correction driving mechanism to the movable base body 23 is greater than the weight of the movable base body 23, such that the movable base body 23 moves upward as a whole until the detecting values of the sensor 29 match with the corresponding predetermined values. Thus, the controller determines that the movable base body 23 is not sinking. In this case, the supporting force of the correction driving mechanism to the movable base body 23 is equal to the weight of the movable base body 23.

Figure 25:
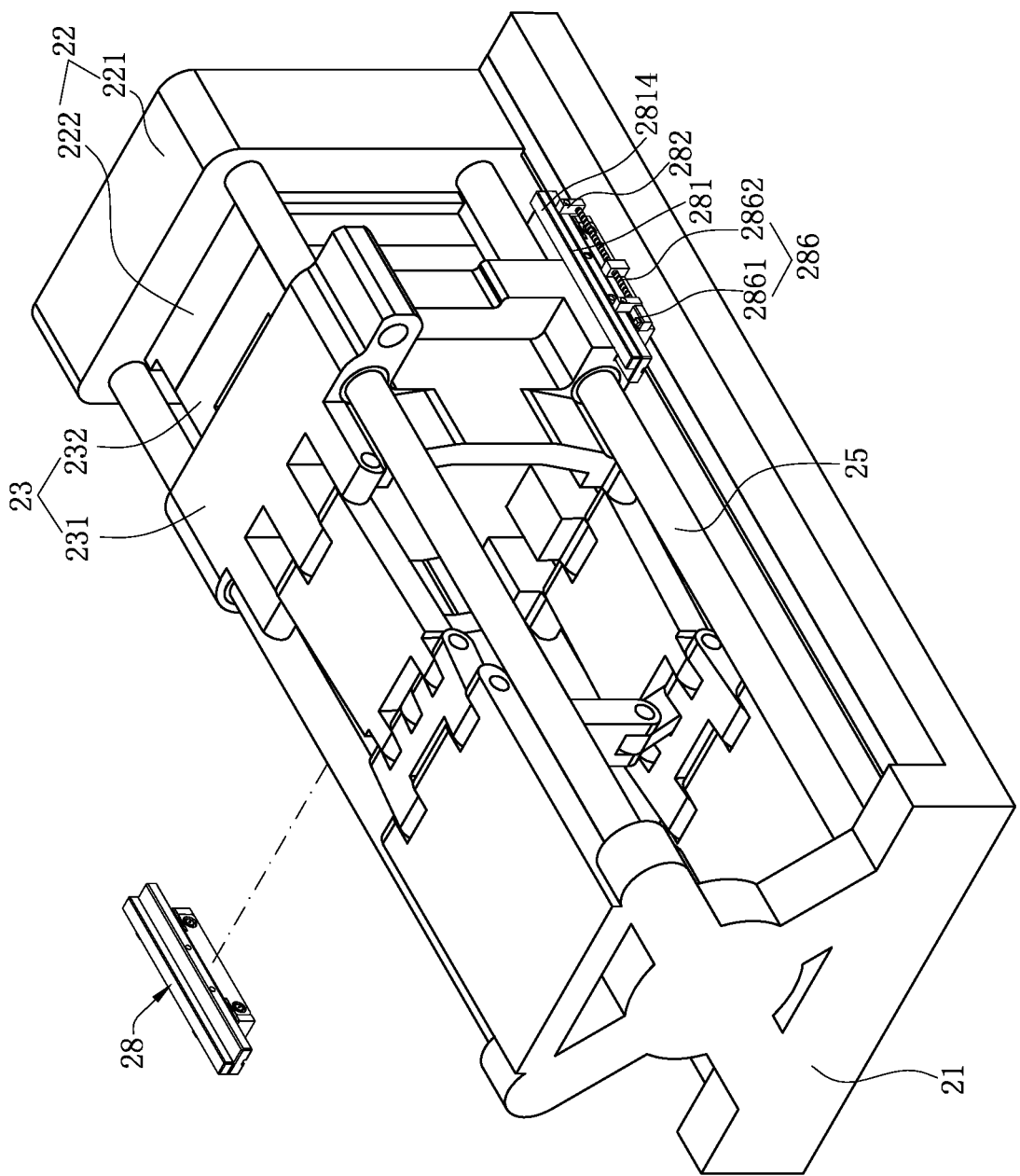
FIG. 25 is a perspective view of the device body when the correction mechanism is movable relative to the movable base body according to other embodiments of the present invention.
Figure 26:
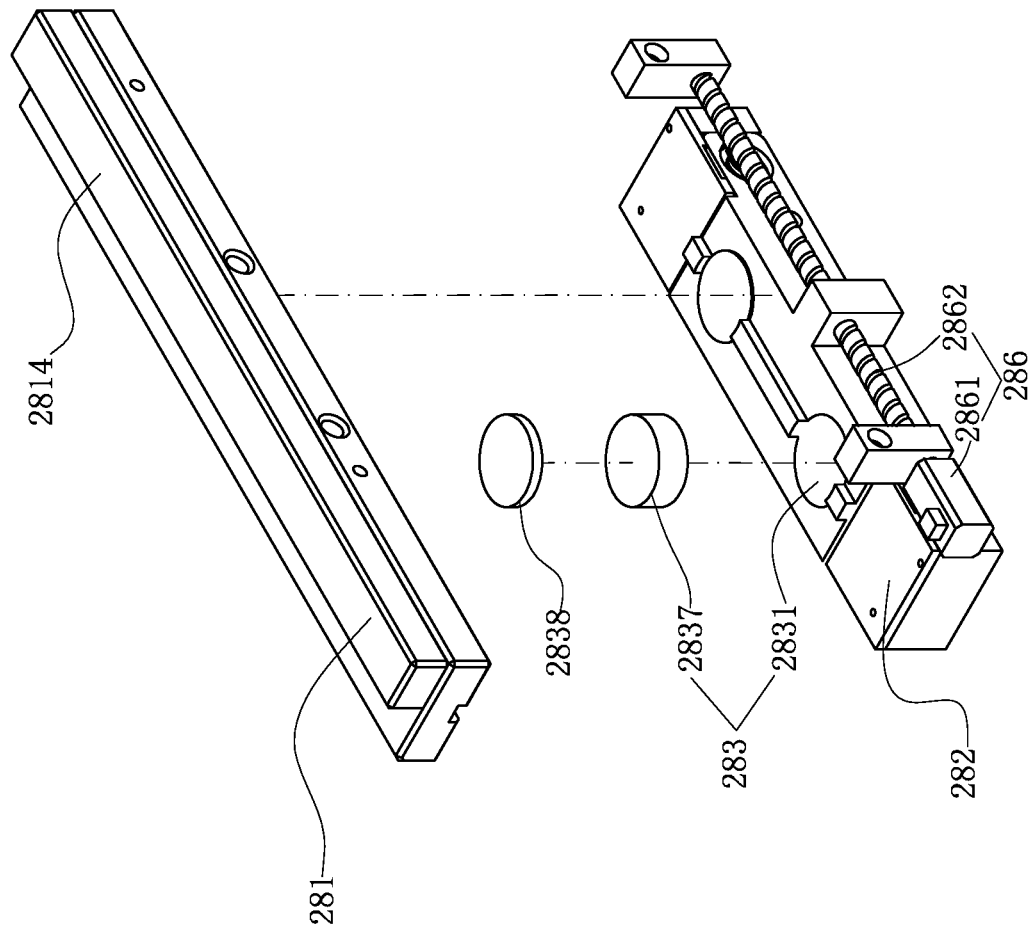
FIG. 26 is a structural schematic view of the correction mechanism when the correction mechanism is movable relative to the movable base body according to other embodiments of the present invention.

As shown in FIG. 25 and FIG. 26, an embodiment is provided showing the correction driving mechanism to be movable relative to the movable base body 23 along the sliding direction of the movable base body 23. The correction mechanism 28 includes an adjusting mechanism 286. The adjusting mechanism 286 includes an adjusting motor 2861 and an adjusting screw bolt 2862 connected to the adjusting motor 2861. (In other embodiments, the adjusting mechanism 286 may be an air cylinder or an oil cylinder, or other driving mechanisms.) The adjusting motor 2861 and the upper supporting member 281 are both fixed to the movable mold base 231. The adjusting screw bolt 2862 passes through the lower supporting member 282 and adjusts the lower supporting member 282 to move reciprocally along the sliding direction of the movable base body 23. The lower supporting member 282 is provided with two accommodating cavities 2831, and two pistons 2837 are provided corresponding to the two accommodating cavities 2831. The upper supporting member 281 is not provided with the clamping portion 2811, such that the upper supporting member 281 and the lower supporting member 282 do not match to form an association therewith. When the adjusting mechanism 286 adjusts the lower supporting member 282, the lower supporting member 282 moves along the sliding direction of the movable base body 23 relative to the upper supporting member 281, and the two air cylinders 283 correspondingly move to different supporting positions Q. In the cases where the movable base body 23 sinks and/or tilts, the controller 3 controls the adjusting motor 2861, and the adjusting screw bolt 2862 adjusts the lower supporting member 282 to move along the sliding direction of the movable base body 23, such that one of the air cylinders 283 moves to the corresponding supporting position Q. The controller 3 correspondingly controls the air cylinder 283 to generate an upward supporting force to the upper supporting member 281 to adjust the movable base body, such that the detecting values of the sensor 29 match with the corresponding predetermined values. When the gravity center P of the movable base body 23 is located at an outer side of the movable mold base 231 and close to the fixed base body 22, the controller 3 controls the air cylinders 283 to be correspondingly located below the extending portion 2814 and to correspondingly adjust the movable base body 23.

In other embodiments, the sensor 29 may determine whether the movable base body 23 tilts by detecting the tilting angle a of the movable base body 23. In this case, the movable base body 23 has a predetermined tilting angle value. The predetermined tilting angle value is a base value configured in the controller 3 for the case when the movable base body 23 does not generate an acting force to the guide rods 25. The predetermined tilting angle value can be a single value or a range value, which is based on the movable base body 23 not generating an acting force to the guide rods 25. The controller 3 determines whether the corresponding detecting values of the sensor 29 match with the predetermined tilting angle value to correspondingly control the correction mechanisms 28 to adjust the tilting angle a of the movable base body 23. The tilting angle a of the movable base body 23 may be detected by one sensor 29, or may be detected by multiple sensors 29 altogether. The multiple sensors 29 can be the same, or may be different, as long as the controller 3 may be determine the tilting angle value of the movable base body 23 according to the sensors 29. For example, the sensors 29 can be all clearance sensors 291, or can be all force sensors 292, or can be all height sensors. Alternatively, one of the sensors 29 can be the clearance sensor 291, and the other sensor 29 is the force sensor 292, etc. Further examples are not hereinafter elaborated. With the sensors 29 being used to detect the tilting angle a of the movable base body 23 to determine whether the movable base body 23 tilts, the controller 3 may directly control the driving mechanism to adjust the tilting angle a of the movable base body 23 by the tilting angle a of the movable base body 23, such that the tilting angle value of the movable base body 23 after the adjustment matches with the predetermined tilting angle value as a whole, and the acting forces of the movable base body 23 to the guide rods 25 at multiple positions are correspondingly reduced as a whole. Thus, the adjustment of the driving mechanism is more accurate, and the overall wear of the movable base body 23 and the guide rods 25 are reduced.

When the tilting angle a of the movable base body 23 is detected by one sensor 29, the sensor 29 is a tilting angle sensor 29 or other sensors 29 that may be used to detect the tilting angle a of the movable base body 23. The tilting angle sensor 29 may be provided on the movable base body 23, or may be provided at other positions capable of detecting the tilting angle a of the movable base body 23. When the tilting angle a of the movable base body 23 is detected by multiple sensors 29, the controller 3 performs corresponding calculations according to the detecting values of the sensors 29 to obtain the tilting angle a of the movable base body 23.

Figure 23:
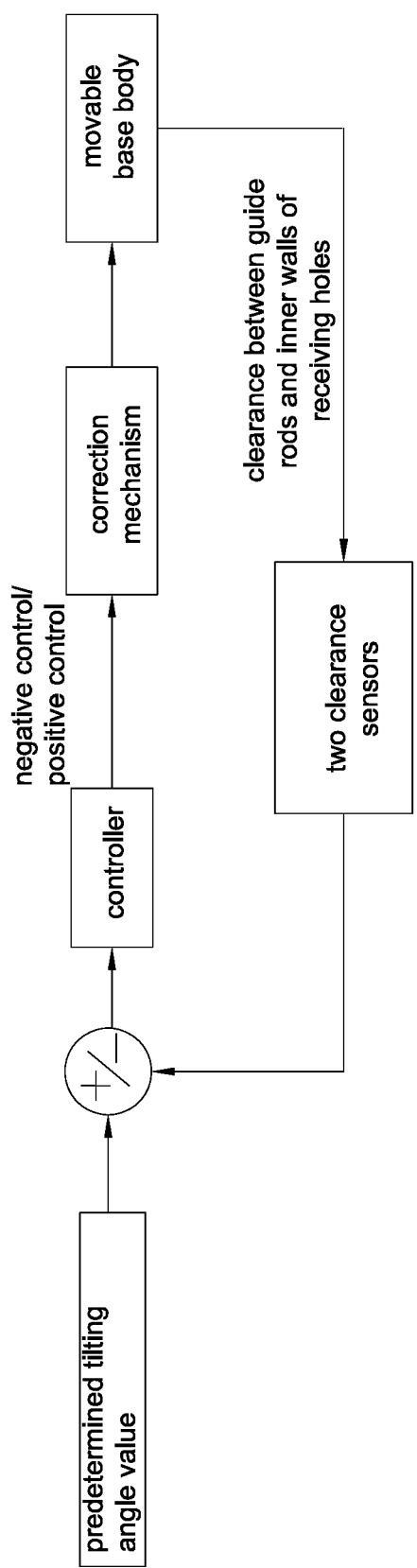
FIG. 23 is a control flowchart when the sensor detects whether the movable mold base is tilting according to other embodiments of the present invention.

As shown in FIG. 21 to FIG. 23, four clearance sensors 29 may be used to detect the tilting angle a of the movable base body 23. The controller 3 may obtain the tilting angle value of the movable base body 23 according to the clearance variations detected by any two of the clearance sensors 29, and determine whether the tilting angle value matches with the predetermined tilting angle value, thereby correspondingly controlling the correction mechanisms to adjust the tilting angle a of the movable base body 23. When the controller 3 obtains the tilting angle a of the movable base body 23 according to the clearance variations detected by the first clearance sensor 2911 and the fourth clearance sensor 2914, the first clearance sensor 2911 is located close to the fixed base body 22 relative to the fourth clearance sensor 2914, and the two clearance sensors 291 are located on a same height level, such that the two clearance sensors 291 are in parallel to a horizontal plane. When the movable base body 23 tilts, the two clearance sensors 291 correspondingly tilt, such that the detecting values of the two clearance sensors 291 related to the tilting angle a of the movable base body 23 are more accurate and intuitive, without the need for the controller 3 to perform additional calculation for determining the tilting angle a of the movable base body 23, facilitating the controller 3 to control the correction mechanisms 28 to adjust the movable base body 23, and reducing the calculation of the controller 3. Using the example that the controller 3 obtains the tilting angle a of the movable base body 23 according to the detecting values of the first clearance sensor 2911 and the fourth clearance sensor 2914, the predetermined tilting angle value is set to be zero. When the movable base body 23 tilts downward, the detecting values of the first clearance sensor 2911 and the fourth clearance sensor 2914 are changed to be greater than zero, and the detecting value of the first clearance sensor 2911 is less than the detecting value of the fourth clearance sensor 2914.

To sum up, the injection molding machine device 100 according to certain embodiments of the present invention has the following beneficial effects:

(1) By providing the sensor 29 to detect the clearances and contact forces between different components, and providing the predetermined clearance values and the predetermined contact force values corresponding to the sensor 29, the controller 3 may correspondingly control the correction mechanism 28 to adjust the movable base body 23 by determining whether corresponding detecting values of the sensor 29 match with the predetermined values, thereby knowing whether the movable base body 23 generates an acting force to the guide rods 25 real-time and accurately, and correspondingly adjust the movable base body 23 to reduce the acting force applied to the guide rods 25, thus facilitating automation control without manual adjustments, reducing the adjusting error of the correction mechanism 28 such that the correction mechanism 28 adjusts the height of the movable base body 23 more accurately, knowing the sinking height or tilting degree of the movable base body 23 real-time and accurately without obtaining the adjustment height of the movable base body 23 by manual estimation or repeated testing, reducing human cost and increasing production efficiency, such that the adjustment height of the movable base body 23 matches with the actual sinking height and tilting height, significantly reducing the acting force by the movable base body 23 to the guide rods 25 such that the wear of the movable base body 23 and the guide rods 25 is reduced, enhancing the usage life of the guide rods 25 and the movable base body 23, and correspondingly enhancing the life of the injection molding machine device 100. Further, when multiple sensors 29 are provided, the controller 3 may perform determination according to the detecting values of the sensors 29 and correspondingly control the correction mechanism 28, such that the moving position of the movable base body 23 is more accurate by multiple determinations.

(2) The one side of the movable base body 23 having the first mold 232 has a greater weight. Thus, each of the guide rods 25 receives a greater downward acting force at the end adjacent to the first mold 232, such that the deformation amounts of the guide rods 25 are relatively larger, the clearance variation detected by the clearance sensor 291 becomes more significant, and the detecting result becomes more intuitive and accurate. Correspondingly, the adjustment of the correction mechanism 28 to the movable base body 23 is more accurate.

(3) The lower supporting member 282 slides along the guide rails 24 in association with the movable base body 23. The contact-type clearance sensor 291 is provided on the lower supporting member 282 and in contact with the lower end of the guide rods 25. Using the contact-type clearance sensor 291 may save the mounting space of the contact-type clearance sensor 291. Further, the contact-type clearance sensor 291 is mounted on the correction mechanism 28, facilitating the mounting of the contact-type clearance sensor 291 and the electronic line arrangements with the correction mechanisms 28. The contact-type clearance sensor 291 slides on the guide rails 24 correspondingly with the correction mechanisms 28. In the process, the contact-type clearance sensor 291 detects the deformation amounts of the guide rods 25 at different positions of the guide rods 25, such that the controller 3 correspondingly controls the correction mechanisms 28 to adjust the movement of the movable base body 23 in the vertical direction in the sliding process, thus reducing the acting force applied to the guide rods 25 in the sliding process of the movable base body 23, such that the guide rods 25 are protected in the longer stroke, further enhancing the usage life of the guide rods 25 and the movable base body 23, and allowing the movable base body 23 and the fixed base body 22 to direct act in closing the mold without waiting for the adjustment of the movable base body 23, and enhancing the production efficiency.

(4) The guide sleeves 233 are located in the receiving holes 234, and the force sensor 292 is provided on the guide sleeves 233. Each guide sleeve 233 has a smaller size relative to the movable mold base 231. Correspondingly, it is easier and more convenient to machine the guide sleeves 233 and to mount the force sensor 292, which facilitates the mounting of the force sensor 292 and the convenience for the detachment and replacement of the force sensor 292. Further, the force sensor 292 moves together with the sliding of the movable base body 23, such that the guide rods 25 are more protected in the sliding stroke, further enhancing the usage life of the guide rods 25 and the movable base body 23.

(5) Two sensors 29 are provided, in which one of the sensors 29 is close to the fixed base body 22 relative to the other sensor 29, such that the two sensors 29 form a connecting line, and the controller 3 may determine whether the movable base body 23 tilts by the detecting values of the two sensors 29, and correspondingly control the correction mechanisms 28 to drive the movement of the movable base body 23 in the vertical direction and to adjust the tilting angle a of the movable base body 23, such that the tilting angle a of the movable base body 23 is reduced, thus reducing the acting force to the guide rods 25 due to the tilting of the movable base body 23, preventing the movable base body 23 and the guide rods 25 from wear, and enhancing the usage life of the guide rods 25 and the movable base body 23. The correction driving mechanism is located at the right side of the gravity center P to drive the movement of the movable base body 23 in the vertical direction, such that the movable base body 23 tilting toward the lower right direction rotates counterclockwise to reduce the tilting angle a of the movable base body 23, allowing the detecting values of the sensor 29 to reach the corresponding predetermined values, such that the acting force of the movable base body 23 to the guide rods 25 is reduced.

(6) With the sensors 29 being used to detect the tilting angle a of the movable base body 23 to determine whether the movable base body 23 tilts, the controller 3 may directly control the driving mechanism to adjust the tilting angle a of the movable base body 23 by the tilting angle a of the movable base body 23, such that the tilting angle value of the movable base body 23 after the adjustment matches with the predetermined tilting angle value as a whole, and the acting forces of the movable base body 23 to the guide rods 25 at multiple positions are correspondingly reduced as a whole. Thus, the adjustment of the driving mechanism is more accurate, and the overall wear of the movable base body 23 and the guide rods 25 are reduced.

(7) One of the sensors 29 is close to the fixed base body 22 relative to the other sensor 29, such that the positions of the two sensors 29 change significantly, facilitating the detecting values of the sensors 29 to be more accurate and changing more significantly. The two sensors 29 are located on a same height level, such that the two sensors 29 are in parallel to a horizontal plane. When the movable base body 23 tilts, the two sensors 29 correspondingly tilt, such that the detecting values of the two sensors 29 related to the tilting angle a of the movable base body 23 are more accurate and intuitive, without the need for the controller 3 to perform additional calculation for determining the tilting angle a of the movable base body 23, facilitating the controller 3 to control the correction mechanisms 28 to adjust the movable base body 23, and reducing the calculation of the controller 3.

(8) The adjusting mechanism 286 is connected with the correction driving mechanism, and adjusts the correction driving mechanism to move reciprocally along the sliding direction of the movable base body 23, without providing multiple correction driving mechanisms, thus ensuring the correction driving mechanism adapts to the position change of the gravity center P of the movable base body 23, reducing the quantity of the correction driving mechanism, and saving the cost of the correction driving mechanism.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. An injection molding machine device, comprising: a rack; at least one guide rail fixed to the rack; at least two guide rods, wherein one of two ends of each of the at least two guide rods is fixed to the rack; a fixed base body fixed to one end of the rack, wherein the other of the two ends of each of the at least two guide rods is fixed to the fixed base body; a movable base body provided directly opposite to the fixed base body, wherein the movable base body is provided with at least two receiving holes to correspondingly receive the at least two guide rods, the movable base body slides along the at least two guide rods relative to the fixed base body, and the movable base body has a predetermined tilting angle value; at least one correction mechanism located between the movable base body and the guide rail to adjust a movement of the movable base body in a vertical direction and to adjust a tilting angle of the movable base body; wherein at least one sensor electrically connected to a controller, wherein the controller correspondingly controls the correction mechanism by determining whether a corresponding detecting value of the sensor matches with the predetermined tilting angle value;
wherein: the sensor is a tilting angle sensor; or the injection molding machine device comprises at least two sensors provided at intervals along a sliding direction of the movable base body or the vertical direction, the controller correspondingly controls the correction mechanism by determining whether corresponding detecting values of the two sensors match with the predetermined tilting angle value;
and wherein: the predetermined tilting angle value is zero, one of the two sensors is located closer to the fixed base body than the other of the two sensors, and the two sensors are located at a same horizontal level.

2. The injection molding machine device according to claim 1, wherein the movable base body has a gravity center, the correction mechanism has a correction driving mechanism located at one side of the gravity center close to the fixed base body to adjust the tilting angle of the movable base body.

3. The injection molding machine device according to claim 2, wherein the correction mechanism is fixed below the movable base body and slides along the guide rail in association with the movable base body, the correction mechanism has two correction driving mechanisms respectively located at two sides of the gravity center along a sliding direction of the movable base body, the two correction driving mechanisms respectively adjust the tilting angle of the movable base body, the correction mechanism has an upper supporting member, and the two correction driving mechanisms drive the upper supporting member to adjust the tilting angle of the movable base body.

4. The injection molding machine device according to claim 3, wherein:
the correction mechanism has a lower supporting member sliding along the guide rail in association with the movable base body;
when at least one of the correction driving mechanisms is a correction motor, the upper supporting member is located between the lower supporting member and the movable base body, and the correction motor is fixed to the lower supporting member and drives the upper supporting member to adjust the movement of the movable base body in the vertical direction; and
when at least one of the correction driving mechanisms is an air cylinder or an oil cylinder, the air cylinder or the oil cylinder has at least one accommodating cavity and a piston provided between the upper supporting member and the lower supporting member, the piston is received correspondingly in the accommodating cavity, and the piston is connected to the upper supporting member and drives the upper supporting member to adjust the movement of the movable base body in the vertical direction.

5. The injection molding machine device according to claim 2, wherein the movable base body has two supporting positions respectively located at two sides of the gravity center along a sliding direction of the movable base body, the correction mechanism has two correction driving mechanisms respectively provided corresponding to the two supporting positions, and the two correction driving mechanisms individually apply supporting forces upward to the two supporting positions to correspondingly adjust the tilting angle of the movable base body.

6. The injection molding machine device according to claim 5, wherein the movable base body has a movable mold base and a first mold fixed and connected to one end of the movable mold base close to the fixed base body, one side of the movable mold base close to the fixed base body has an end surface, an extending portion is fixed to the movable mold base or is integrally formed with the movable mold base, the extending portion passes beyond the end surface and extends to be located between the gravity center and the fixed base body, one of the two supporting positions is located on the extending portion and located at one side of the gravity center close to the fixed base body, and the correction driving mechanism is located below the extending portion corresponding to the supporting positions.

7. The injection molding machine device according to claim 1, wherein the correction mechanism has an adjusting mechanism and at least one correction driving mechanism, the adjusting mechanism is connected to the correction driving mechanism to adjust the correction driving mechanism to move reciprocally along a sliding direction of the movable base body, and the correction driving mechanism correspondingly adjust the tilting angle of the movable base body.

8. The injection molding machine device according to claim 7, wherein the correction mechanism has an upper supporting member, the adjusting mechanism comprises an adjusting motor and an adjusting screw bolt connected to the adjusting motor, the adjusting motor and the upper supporting member are both fixed to the movable base body, the adjusting screw bolt is connected to the correction driving mechanism to adjust the correction driving mechanism to move reciprocally along the sliding direction of the movable base body.

\* \* \* \* \*